United States Patent [19]

Aoki

[11] Patent Number: 5,029,994
[45] Date of Patent: Jul. 9, 1991

[54] LARGE-APERTURE QUASI-TELEPHOTO LENS SYSTEM

[75] Inventor: Norihiko Aoki, Tokyo, Japan

[73] Assignee: Olympus Optical Co., Ltd., Tokyo, Japan

[21] Appl. No.: 347,067

[22] Filed: May 4, 1989

[30] Foreign Application Priority Data

May 6, 1988 [JP] Japan ................................ 63-108933
Mar. 24, 1989 [JP] Japan .................................... 1-70708

[51] Int. Cl.$^5$ ........................ G02B 13/02; G02B 9/62; G02B 9/64
[52] U.S. Cl. .................................. 350/454; 350/413
[58] Field of Search ............... 350/413, 454, 455, 464

[56] References Cited

U.S. PATENT DOCUMENTS 4,840,467  6/1984  Takada et al. .................. 350/413 X
4,842,386  6/1989  Kiragishi et al. ............... 350/413 X

FOREIGN PATENT DOCUMENTS 59-149312  8/1984  Japan .

Primary Examiner—Scott J. Sugarman
Attorney, Agent, or Firm—Cushman, Darby & Cushman

[57] ABSTRACT

A large-aperture quasi-telephone lens system having favorably corrected aberrations, especially chromatic aberration, and providing images of high quality comprising, in the order from the object side, a front lens group, a stop and a rear lens group, said rear lens group consisting of a lens component having negative refractive power and a lens group having positive refractive power, and comprising at least one graded refractive index lens element.

24 Claims, 20 Drawing Sheets

5,029,994

LARGE-APERTURE QUASI-TELEPHOTO LENS SYSTEM

BACKGROUND OF THE INVENTION (a) Field of the invention

The present invention relates to a large-aperture quasi-telephoto lens system comprising a graded refractive index lens element (GRIN lens element), and more specifically a so-called axial type GRIN lens element having a refractive index varying in the direction along the optical axis (axial GRIN lens element).

(b) Description of the prior art

In recent years, when automatic focusing mechanisms are built in single lens reflex cameras and lens shutter cameras, zoom lens systems are incorporated in most cameras for permitting photographing at various field angles in simple procedures. However, since it is rather difficult to design a bright zoom lens system having a small F number, it is not so easy to correct aberrations sufficiently in a zoom lens system as compared with correction of aberrations in a lens system having a single focal length. In order to meet users'0 demand for a lens system which can provide bright images of high quality, it is therefore necessary to design a large-aperture lens system having a single focal length and providing high quality images.

If an attempt is made to design such a lens system by using spherical lens components only, the lens system will inevitably have a long total length and comprise a large number of lens components, thereby requiring high manufacturing cost and being low in portability. On the other hand, aspherical surfaces are used for obtaining a lens system comprising a small number of lens components and having favorably corrected aberrations. In case of a bright lens system having a small F number, however, each of the lens components will have a large diameter, thereby making it difficult to shape an aspherical lens component and increasing manufacturing cost of the lens system.

In order to correct the defect described above, it is practiced to use GRIN lens components having varying refractive indices. The GRIN lens components are classified into radial GRIN lens components whose refractive indices vary in the radial direction and axial GRIN lens components whose refractive indices vary in the direction along the optical axis. Out of these GRIN lens components, the radial GRIN lens components can hardly be used in lens systems for cameras since it is difficult to obtain radial GRIN lens components having large diameters by the manufacturing techniques currently available. On the other hand, it is possible to obtain axial GRIN lens components having large diameters which can provide the effect of the aspherical surface even when the lens components have spherical surfaces that are easily manufacturable.

As a conventional example of lens systems using the axial GRIN lens components, there is known the lens system disclosed by Japanese Unexamined Published Patent Application No. 149312/59.

However, the GRIN lens component used in the lens system mentioned above as the conventional example has no function to correct chromatic aberration. Further, this conventional example is a large-aperture standard lens system which is not a large-aperture quasi-telephoto lens system.

SUMMARY OF THE INVENTION

A primary object of the present invention is to provide a large-aperture quasi-telephoto lens system which can form high quality images and is so adapted as to correct chromatic aberration by arranging a GRIN lens element at such a location as to correct aberrations more favorably in the lens system and designing the GRIN lens element so as to have different refractive index gradients at individual wavelengths.

The large-aperture quasi-telephoto lens system according to the present invention comprises a front lens group arranged on the object side of a stop and a rear lens group arranged on the image side of the stop. The rear lens group comprises, in the order from the stop, a lens component having negative refractive power and another lens component having positive refractive power, and at least one of the lens elements arranged in the rear lens group is designed as a graded refractive index lens. Said negative lens component consists of a single lens element or a negative cemented doublet, whereas said positive lens component consists of a single or plural lens element(s) arranged on the image side of said negative lens component.

As a lens system has a larger aperture, the light flux passing through the lens system generally has a larger diameter and correction of aberrations becomes more difficult accordingly.

When a light flux parallel to the optical axis is incident on a certain refracting surface, spherical aberration, for example, is produced due to the fact that angles of incidence of rays are larger as the incident rays become higher and locations at which the rays refracted by the refracting surface intersect with the optical axis are different depending on the height of the rays. Though the difference among the locations intersecting with the optical axis depending on the heights of the rays is small in a lens system having a large F number, the difference is large and the spherical aberration is remarkable in a lens system having a large aperture. It is necessary to increase the number of lens components of the lens system in order to correct the spherical aberration.

Two methods are conceivable to correct the spherical aberration without increasing the number of lens components.

One of the two method is to arrange, in the lens system, an aspherical surface having such a shape as to lower carveture as the rays become higher. Aspherical surfaces having the shape described above are used in most of the large-aperture lens systems which comprise aspherical surfaces and commercially available under the present circumstance. However, the aspherical surface has no function to correct the chromatic aberration.

The other method is to use a graded refractive index lens so as to vary refractive index depending on locations of incidence (heights of rays). When correction of the spherical aberration only is taken into consideration, it is possible to correct the spherical aberration by using a single graded refractive index lens so designed as to lower refractive index as the rays become higher.

The graded refractive index lenses are classified into the radial type and the axial type, the latter of which has far higher capability to correct aberrations. However, the radial type GRIN lenses hardly permit composing a large-aperture lens systems as already described above. On the other hand, the axial GRIN lenses permit composing a large-aperture lens system and can have the same effect as that of aspherical surfaces even when they have spherical surfaces which are easily manufacturable. Further, when the GRIN lenses are so designed as to have refractive index gradients different at individual wavelengths, these lenses are capable of correcting the chromatic aberration which cannot be corrected with the aspherical surfaces.

The large-aperture quasi-telephoto lens system according to the present invention is characterized in that it has the composition described above and that it comprises at least one axial GRIN lens element.

Generally, large-aperture quasi-telephoto lens systems are mostly designed as modified Gaussian type lens systems. For these lens systems, it is important to correct the sagittal coma produced by the surfaces which are opposite to each other on both the sides of a stop, and for this purpose, these surfaces must have low curvature. When curvature is low on these surfaces, however, Petzval's sum of the lens system has a large positive value.

The lens system according to the present invention is so designed as to positively correct especially the chromatic aberration, and for this purpose Petzval's sum is corrected not by using a glass material having a high refractive index but by arranging a lens component having negative refractive power at a location immediately after the stop.

Gaussian type lens systems and modified Gaussian type lens systems adopt, for prolonging back focal lengths, a composition wherein the lens group arranged on the object side of the stop (front lens group) has a weak refractive power and the lens group arranged on the image side of the stop (rear lens group) is designed as a contracting system. Accordingly, the rear lens group produces more remarkable aberrations.

The lens system according to the present invention does not adopt the GRIN lens element simply. In order to allow the GRIN lens element to exhibit its aberration correcting function more effectively, the lens system according to the present invention comprises at least one axial GRIN lens element in the rear lens group which is designed as a contracting system and has strong refractive power. Owing to this design, aberrations are corrected more favorably in the lens system according to the present invention.

An axial GRIN lens has a high aberration correcting function when it has a refractive index gradient over the entire range of the lens and provides, even when it has spherical surfaces on both the sides thereof, the effect similar to that of a lens having aspherical surfaces on both sides thereof. Taking manufacturing time and manufacturing cost into consideration, it is impossible to reserve so large a thickness in the direction of which the refractive index is graded, i.e., in the direction along the optical axis. In order to make most of the effect of the refractive index gradient, it is therefore desirable to design the GRIN lens element as described below:
Now, let us adopt the following assumptions for the GRIN lens element:

(+1) represents the relationship (refractive index of the lens portion located on the extreme object side)<(-refractive index of the lens portion located on the extreme image side), and (-1) represents the relationship (refractive index of the lens portion located on the extreme object side)>(refractive index of the lens portion located on the extreme image side). In case of a GRIN lens element having the relationship of (+1), it is effective for correcting aberrations to design the image side surface of the GRIN lens element as a convex surface. In case of a lens system consisting only of homogenous lenses, it is necessary for correcting the spherical aberration sufficiently to correct the spherical aberration of high orders which are apt to be undercorrected. For this purpose, the two negative lens elements arranged on both the sides of the stop must have strong refractive powers which will aggravate the sagittal coma.

Accordingly, it is possible to prevent the spherical aberration of high orders from being undercorrected and weaken the refractive powers of the negative lens elements arranged on both the side of the stop by using the GRIN lens element having the refractive index distribution described above and the surfaces of the shape described above in the lens system.

Further, in case of a GRIN lens element having the relationship of (−1) and to be used as a negative lens element, it is desirable to design it as a negative meniscus lens element having a concave surface on the object side. This design makes it possible to lower refractive index of the concave surface and correct the sagital coma of high orders. Since the spherical aberration of high orders is overcorrected in this case, the image side surface is designed as a convex surface for correcting the overcorrected spherical aberration of high orders.

Furthermore, in case of a GRIN lens element having the relationship of (−1) and to be used as a positive lens element, it is preferable to design the lens element as a positive lens element having a convex surface on the object side. Since this design lowers refractive index for higher rays, it enables favorable correction of the spherical aberration of high orders.

Moreover, the present invention corrects the chromatic aberration, especially the spherical aberration of chromatic aberration, in the lens system by designing the GRIN lens element in such a manner that the refractive index gradients are different at individual wavelengths.

It is more preferable to design the lens system according to the present invention described above so as to satisfy the following conditions:

$$-6.0 < f_n/f < 0 \tag{1}$$

$$-0.10 < f_p/f < 0.8 \tag{2}$$

$$5.0 \times 10^{-3} < \{|r| - \sqrt{r^2 - (\phi/2)^2}\}/f < 9.5 \times 10^{-2} \tag{3}$$

wherein the reference symbol $f_n$ represents focal length of the lens component having negative refractive power arranged in the rear lens group, the reference symbol $f_p$ designates focal length of the lens component having positive refractive power arranged in the rear lens group, the reference symbol f denotes focal length of the lens system as a whole, the reference symbol r represents radius of curvature on the surface of the GRIN lens element whichever has the higher refractive index on the optical axis and the reference symbol $\phi$ designates effective diameter of said surface.

If the lower limit of the condition (1) is exceeded, refractive power of the negative lens component will be too weak and especially the aspherical aberration of high orders will be undercorrected. In order to correct the undercorrected spherical aberration, refractive power of the positive lens component arranged on the image side of the stop must be weakened and total length of the lens system will be undesirably prolonged accordingly. If the upper limit of the condition (1) is exceeded, in contrast, the negative lens component will have positive refractive power and it will be impossible to reserve a small Petzval's sum.

If the lower limit of the condition (2) is exceeded, the positive lens component arranged in the rear lens group will have too strong refractive power, the spherical aberration will be undercorrected and the image plane cannot be flattened. If the upper limit of the condition (2) is exceeded, in contrast, the spherical aberration will inversely be overcorrected and the total length of the lens system will be undesirably prolonged.

If the lower limit of the condition (3) is exceeded, the distance of the GRIN lens component having refractive index distribution in the direction along the optical axis will be too short and the aberration correcting function will be lowered accordingly. If the upper limit of the condition (3) is exceeded, in contrast, it will be difficult to manufacture the lens in practice.

Further, in cases where the surface having the refractive index gradient is designed as a concave surface, it is more preferable to substitute the lower limit of the condition (3) for that of the following condition (3'):

$$(3') \; 1.0 \times 10^{-2} < \{|r| - \sqrt{r^2 - (\phi/2)^2}\}/f < 9.5 \times 10^{-2}$$

If the lower limit of the condition (3') is exceeded, only the marginal portion of the concave surface has the refractive index gradient, whereas the lens portion in the vicinity of the optical axis will have no refractive index gradient and be homogenous. Accordingly, the concave surface will not have the function to correct the aberrations. If the upper limit of the condition (3') is exceeded, in contrast, it will be difficult to manufacture the GRIN lens element in practice like the case where the upper limit of the condition (3) is exceeded.

Furthermore, it is more preferable to design the lens system according to the present invention so as to satisfy the following condition (4):

$$TL/f < 1.6 \tag{4}$$

wherein the reference symbol TL represents distance as measured from the formost lens surface of the lens system to the image plane in the condition where the lens system is focused on an object located at infinite distance.

The condition (4) defines total length of the lens system. If the upper limit of the condition (4) is exceeded, the total length of the lens system will be too long and undesirable from the viewpoint of portability of the lens system.

In order to maintain the favorably corrected aberration condition over the entire focusing range from focusing on an object located at infinite distance to the focusing on an object located at short distance at a magnification level on the order of $-0.1\times$, the lens system according to the present invention incorporates a so-called floating mechanism which permits varying at least one of the airspaces reserved in the rear lens group arranged after the stop.

DETAILED DESCRIPTION OF THE PREFERRED EMBODIMENTS

Figure 1:
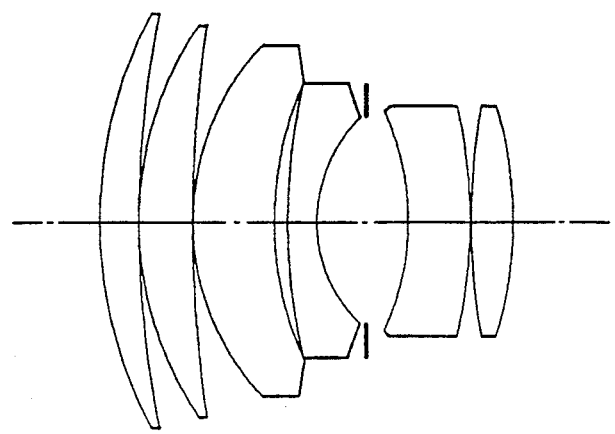
FIG. 1 shows a sectional view illustrating Embodiment 1 of the lens system according to the present invention.

Now, the large-aperture quasi-telephoto lens system according to the present invention will be described in detail below with reference to the preferred embodiments given in the form of the following numerical data:

| Embodiment 1 f = 85 mm F/1.4 2ω 28.5° | | | |
|---|---|---|---|
| $r_1 = 65.2795$ | | | |
| | $d_1 = 6.1550$ | $n_1 = 1.61700$ | $\nu_1 = 62.79$ |
| $r_2 = 154.4082$ | | | |
| | $d_2 = 0.0011$ | | |
| $r_3 = 51.7524$ | | | |
| | $d_3 = 8.4862$ | $n_2 = 1.49700$ | $\nu_2 = 81.61$ |
| $r_4 = 199.3474$ | | | |
| | $d_4 = 0.0335$ | | |
| $r_5 = 38.0218$ | | | |
| | $d_5 = 12.9137$ | $n_3 = 1.75500$ | $\nu_3 = 52.33$ |
| $r_6 = 50.6558$ | | | |
| | $d_6 = 2.1019$ | | |
| $r_7 = 87.9620$ | | | |
| | $d_7 = 4.5474$ | $n_4 = 1.76182$ | $\nu_4 = 26.52$ |
| $r_8 = 21.6610$ | | | |
| | $d_8 = 7.0023$ | | |
| $r_9 =$ (stop) | | | |
| | $d_9 = 7.2885$ | | |
| $r_{10} = -38.4573$ | | | |
| | $d_{10} = 9.6146$ | $n_5 =$ (GRIN lens) | |
| $r_{11} = -73.0650$ | | | |
| | $d_{11} = 0.1620$ | | |
| $r_{12} = 99.2370$ | | | |
| | $d_{12} = 6.5274$ | $n_6 = 1.77250$ | $\nu_5 = 49.66$ |
| $r_{13} = -58.2365$ | | | |
| Formula of refractive index distribution: $n(x) = n_0 + n_1 x$ | | | |
| d-line: $n_0 = 1.68893$  $n_1 = -0.15000 \times 10^{-1}$ | | | |
| g-line: $n_0 = 1.71781$  $n_1 = -0.15600 \times 10^{-1}$ | | | |

Value of n is obtained at a point of 3 mm as measured toward the image side from the intersection between the 10the surface and the optical axis.

$f_n/f = -1.3923$ $f_p/f = 0.5692$ $\{|r| - \sqrt{r^2 - (\phi/2)^2}\}/f = 3.6184 \times 10^{-2}$  $TL/f = 1.2122$ (Effective diameter of the 10th surface: $\phi = 30.14$)

| Embodiment 2 f = 85 mm F/1.4 2ω = 28.5° | | | |
|---|---|---|---|
| $r_1 = 59.7966$ | | | |
| | $d_1 = 7.4426$ | $n_1 = 1.69680$ | $\nu_1 = 56.49$ |
| $r_2 = 113.6537$ | | | |
| | $d_2 = 0.0011$ | | |
| $r_3 = 48.6327$ | | | |
| | $d_3 = 8.8889$ | $n_2 = 1.56873$ | $\nu_2 = 63.16$ |
| $r_4 = 169.3874$ | | | |
| | $d_4 = 0.0335$ | | |
| $r_5 = 35.9994$ | | | |
| | $d_5 = 10.8953$ | $n_3 = 1.69680$ | $\nu_3 = 56.49$ |
| $r_6 = 50.4149$ | | | |
| | $d_6 = 2.3632$ | | |
| $r_7 = 106.7135$ | | | |
| | $d_7 = 3.5567$ | $n_4 = 1.78472$ | $\nu_4 = 25.68$ |
| $r_8 = 21.3185$ | | | |
| | $d_8 = 8.0147$ | | |
| $r_9 = \infty$ (stop) | | | |
| | $d_9 = 10.2981$ | | |
| $r_{10} = -29.3570$ | | | |
| | $d_{10} = 3.8369$ | $n_5 =$ (GRIN lens) | |
| $r_{11} = -55.4477$ | | | |
| | $d_{11} = 0.0000$ | | |
| $r_{12} = 152.7974$ | | | |
| | $d_{12} = 5.3918$ | $n_6 = 1.79952$ | $\nu_5 = 42.24$ |
| $r_{13} = -45.7470$ | | | |
| Formula of refractive index distribution: | | | |

-continued

| Embodiment 2 f = 85 mm F/1.4 2ω = 28.5° |
|---|
| $n(x) = n_0 + n_1 x + n_2 x^2 + n_3 x^3 + n_4 x^4 + n_5 x^5$ |
| d-line: $n_0 = 1.66925$  $n_1 = 0.14463 \times 10^{-1}$ |
| $n_2 = -0.66868 \times 10^{-2}$ |
| g-line: $n_0 = 1.69761$  $n_1 = 0.15116 \times 10^{-1}$ |
| $n_2 = -0.69889 \times 10^{-2}$ |
| d: $n_3 = -0.36256 \times 10^{-2}$  $n_4 = -0.53957 \times 10^{-3}$ |
| $n_5 = -0.26014 \times 10^{-4}$ |
| g: $n_3 = -0.37894 \times 10^{-2}$  $n_4 = -0.56395 \times 10^{-3}$ |
| $n_5 = -0.27189 \times 10^{-4}$ |

Value of n is obtained at a point of 4 mm as measured toward the image side from the intersection between the 10th surface and the optical axis.

$f_n/f = -1.3568$ $f_p/f = 0.5244$ $\{|r| - \sqrt{r^2 - (\phi/2)^2}\}/f = 2.8733 \times 10^{-2}$  $TL/f = 1.1638$ (Effective diameter of the 11th surface: $\phi = 32.55$)

| Embodiment 3 f = 85 mm F/1.4 2ω = 28.5° | | | |
|---|---|---|---|
| $r_1 = 65.5293$ | | | |
| | $d_1 = 5.5000$ | $n_1 = 1.61700$ | $\nu_1 = 62.79$ |
| $r_2 = 158.0158$ | | | |
| | $d_2 = 0.0011$ | | |
| $r_3 = 51.7123$ | | | |
| | $d_3 = 8.0000$ | $n_2 = 1.49700$ | $\nu_2 = 81.61$ |
| $r_4$ 211.2927 | | | |
| | $d_4 = 0.0335$ | | |
| $r_5 = 38.3171$ | | | |
| | $d_5 = 12.7786$ | $n_3 = 1.75500$ | $\nu_3 = 52.33$ |
| $r_6 = 49.5497$ | | | |
| | $d_4 = 2.3803$ | | |
| $r_7 = 89.2058$ | | | |
| | $d_5 = 4.8292$ | $n_4 = 1.76182$ | $\nu_4 = 26.52$ |
| $r_8 = 21.6109$ | | | |
| | $d_6 = 7.0023$ | | |
| $r_9 = \infty$ (stop) | | | |
| | $d_7 = 8.5622$ | | |
| $r_{10} = -33.1898$ | | | |
| | $d_8 = 1.7959$ | $n_5 =$ (GRIN lens) | |
| $r_{11} = -53.8823$ | | | |
| | $d_9 = 6.0769$ | $n_6 = 1.61484$ | $\nu_5 = 51.17$ |
| $r_{12} = -53.8675$ | | | |
| | $d_{10} = 0.0852$ | | |
| $r_{13} = 115.3110$ | | | |
| | $d_{11} = 7.3276$ | $n_7 = 1.77250$ | $\nu_6 = 49.66$ |
| $r_{14} = -54.2703$ | | | |
| Formula of refractive index distribution: $n(x) = n_0 + n_1 x$ | | | |
| d-line: $n_0 = 1.68893$  $n_1 = -0.15000 \times 10^{-1}$ | | | |
| g-line: $n_0 = 1.71781$  $n_1 = -0.15600 \times 10^{-1}$ | | | |

Value of n is obtained at a point of 3 mm as measured toward the image side from the intersection between the 10th surface and the optical axis.

$f_n/f = -1.5213$ $f_p/f = 0.5728$ $\{|r| - \sqrt{r^2 - (\phi/2)^2}\}/f = 4.2362 \times 10^{-2}$  $TL/f = 1.2042$ (Effective diameter of the 10th surface: $\phi = 30.07$)

| Embodiment 4 |
| --- |
| f = 85 mm F/1.4 2ω = 28.5° |

| | | | |
|---|---|---|---|
| $r_1 = 62.5586$ | | | |
| | $d_1 = 7.2518$ | $n_1 = 1.69680$ | $\nu_1 = 56.49$ |
| $r_2 = 125.2975$ | | | |
| | $d_2 = 0.0011$ | | |
| $r_3 = 44.5492$ | | | |
| | $d_3 = 8.8889$ | $n_2 = 1.49831$ | $\nu_2 = 65.03$ |
| $r_4 = 205.2609$ | | | |
| | $d_4 = 0.0335$ | | |
| $r_5 = 36.2846$ | | | |
| | $d_5 = 10.7862$ | $n_3 = 1.69680$ | $\nu_3 = 56.49$ |
| $r_6 = 50.5069$ | | | |
| | $d_6 = 2.7997$ | | |
| $r_7 = 106.3807$ | | | |
| | $d_7 = 3.5060$ | $n_4 = 1.78472$ | $\nu_4 = 25.68$ |
| $r_8 = 21.2889$ | | | |
| | $d_8 = 7.5217$ | | |
| $r_9 = \infty$ (stop) | | | |
| | $d_9 = D_1$ | | |
| $r_{10} = -33.5298$ | | | |
| | $d_{10} = 4.7438$ | $n_5 = 1.69895$ | $\nu_5 = 30.12$ |
| $r_{11} =$ | | | |
| | $d_{11} = 3.0000$ | $n_6 =$ (GRIN lens) | |
| $r_{12} = -60.0975$ | | | |
| | $d_{12} = D_2$ | | |
| $r_{13} = 105.2036$ | | | |
| | $d_{13} = 5.5668$ | $n_7 = 1.79952$ | $\nu_6 = 42.24$ |
| $r_{14} = -57.5176$ | | | |

| Object distance | ∞ | −850 mm |
| --- | --- | --- |
| $D_1$ | 8.230 | 11.977 |
| $D_2$ | 0.000 | 1.180 |

Formula of refractive index distribution:
$n(x) = n_0 + n_1 x + n_2 x^2 + n_3 x^3 + n_4 x^4 + n_5 x^5$
  d-line: $n_0 = 1.68893$  $n_1 = 0.14463 \times 10^{-1}$
    $n_2 = -0.66868 \times 10^{-2}$
  g-line: $n_0 = 1.71781$  $n_1 = 0.15116 \times 10^{-1}$
    $n_2 = -0.69889 \times 10^{-2}$
  d: $n_3 = -0.36256 \times 10^{-2}$  $n_4 = -0.53957 \times 10^{-3}$
    $n_5 = -0.26014 \times 10^{-4}$
  g: $n_3 = -0.37894 \times 10^{-2}$  $n_4 = -0.56395 \times 10^{-3}$
    $n_5 = -0.27189 \times 10^{-4}$ Value of n is obtained at a point of 3 mm as measured toward the image side from the intersection between the 10th surface and the optical axis.

$f_n/f = -1.4202$ $f_p/f = 0.5556$ $\{|r| - \sqrt{r^2 - (\phi/2)^2}\}/f = 2.5001 \times 10^{-2}$  $TL/f = 1.1827$ (Effective diameter of the 12th surface: $\phi = 31.68$)

| Embodiment 5 |
| --- |
| f = 85 mm F/1.4 2ω = 28.5° |

| | | | |
|---|---|---|---|
| $r_1 = 58.0584$ | | | |
| | $d_1 = 8.5034$ | $n_1 = 1.61700$ | $\nu_1 = 62.79$ |
| $r_2 = 210.5386$ | | | |
| | $d_2 = 0.0011$ | | |
| $r_3 = 50.2351$ | | | |
| | $d_3 = 7.8770$ | $n_2 = 1.49700$ | $\nu_2 = 81.61$ |
| $r_4 = 76.7851$ | | | |
| | $d_4 = 0.0335$ | | |
| $r_5 = 40.3027$ | | | |
| | $d_5 = 13.7863$ | $n_3 = 1.75500$ | $\nu_3 = 52.33$ |
| $r_6 = 58.2821$ | | | |
| | $d_6 = 3.2300$ | | |
| $r_7 = 127.4093$ | | | |
| | $d_7 = 3.0008$ | $n_4 = 1.80518$ | $\nu_4 = 25.43$ |
| $r_8 = 23.3055$ | | | |
| | $d_8 = 7.5002$ | | |

-continued

| Embodiment 5 |
| --- |
| f = 85 mm F/1.4 2ω = 28.5° |

| | | | |
|---|---|---|---|
| $r_9 = \infty$ (stop) | | | |
| | $d_9 = 7.0633$ | | |
| $r_{10} = -40.3072$ | | | |
| | $d_{10} = 3.6279$ | $n_5 =$ (GRIN lens) | |
| $r_{11} = -75.6121$ | | | |
| | $d_{11} = 0.0000$ | | |
| $r_{12} = 89.1699$ | | | |
| | $d_{12} = 3.1396$ | $n_6 = 1.74077$ | $\nu_5 = 27.79$ |
| $r_{13} = 89.5073$ | | | |
| | $d_{13} = 4.9430$ | $n_7 = 1.88300$ | $\nu_6 = 40.78$ |
| $r_{14} = -69.3673$ | | | |

Formula of refractive index distribution:
$n(x) = n_0 + n_1 x + n_2 x^2 + n_3 x^3 + n_4 x^4 + n_5 x^5$
  d-line: $n_0 = 1.68893$  $n_1 = 0.14463 \times 10^{-1}$
    $n_2 = -0.66868 \times 10^{-2}$
  g-line: $n_0 = 1.71781$  $n_1 = 0.15116 \times 10^{-1}$
    $n_2 = -0.69889 \times 10^{-2}$
  d: $n_3 = -0.36256 \times 10^{-2}$  $n_4 = -0.53957 \times 10^{-3}$
    $n_5 = -0.26014 \times 10^{-4}$
  g: $n_3 = -0.37894 \times 10^{-2}$  $n_4 = -0.56395 \times 10^{-3}$
    $n_5 = -0.27189 \times 10^{-4}$ Value of n is obtained at a point of 4 mm as measured toward the image side from the intersection between the 10th surface and the optical axis.

$f_n/f = -1.7701$ $f_p/f = 0.5328$ $\{|r| - \sqrt{r^2 - (\phi/2)^2}\}/f = 1.9138 \times 10^{-2}$  $TL/f = 1.1871$ (Effective diameter of the 11th surface: $\phi = 31.20$)

| Embodiment 6 |
| --- |
| f = 85 mm F/1.4 2ω = 28.5° |

| | | | |
|---|---|---|---|
| $r_1 = 60.1726$ | | | |
| | $d_1 = 7.2158$ | $n_1 = 1.69680$ | $\nu_1 = 56.49$ |
| $r_2 = 138.6065$ | | | |
| | $d_2 = 0.0011$ | | |
| $r_3 = 44.7217$ | | | |
| | $d_3 = 8.8890$ | $n_2 = 1.56873$ | $\nu_2 = 63.16$ |
| $r_4 = 161.9916$ | | | |
| | $d_4 = 0.0335$ | | |
| $r_5 = 37.2794$ | | | |
| | $d_5 = 9.9964$ | $n_3 = 1.69680$ | $\nu_3 = 56.49$ |
| $r_6 = 43.4424$ | | | |
| | $d_6 = 3.0500$ | | |
| $r_7 = 113.1780$ | | | |
| | $d_7 = 3.0046$ | $n_4 = 1.78472$ | $\nu_4 = 25.68$ |
| $r_8 = 21.8345$ | | | |
| | $d_8 = 7.8875$ | | |
| $r_9 = \infty$ (stop) | | | |
| | $d_9 = 8.8232$ | | |
| $r_{10} = -30.9772$ | | | |
| | $d_{10} = 2.0000$ | $n_5 = 1.69895$ | $\nu_5 = 30.12$ |
| $r_{11} = \infty$ | | | |
| | $d_{11} = 3.2578$ | $n_6 =$ (GRIN lens) | |
| $r_{12} = -60.9715$ | | | |
| | $d_{12} = 0.0014$ | | |
| $r_{13} = 149.0385$ | | | |
| | $d_{13} = 5.0038$ | $n_7 = 1.79952$ | $\nu_6 = 42.24$ |
| $r_{14} = -61.5843$ | | | |
| | $d_{14} = 0.0025$ | | |
| $r_{15} = -149.3137$ | | | |
| | $d_{15} = 4.3094$ | $n_8 = 1.79952$ | $\nu_7 = 42.24$ |
| $r_{16} = -69.3762$ | | | |

Formula of refractive index distribution:
$n(x) = n_0 + n_1 x + n_2 x^2 + n_3 x^3 + n_4 x^4 + n_5 x^5$
  d-line: $n_0 = 1.68893$  $n_1 = 0.14463 \times 10^{-1}$
    $n_2 = -0.66868 \times 10^{-2}$
  g-line: $n_0 = 1.71781$  $n_1 = 0.15116 \times 10^{-1}$ -continued

Embodiment 6
f = 85 mm F/1.4 2ω = 28.5°

$n_2 = -0.69889 \times 10^{-2}$
d: $n_3 = -0.36256 \times 10^{-2}$  $n_4 = -0.53957 \times 10^{-3}$
$n_5 = -0.26014 \times 10^{-4}$
g: $n_3 = 0.37894 \times 10^{-2}$  $n_4 = -0.56395 \times 10^{-3}$
$n_5 = -0.27189 \times 10^{-4}$ Value of n is obtained at a point of 3.31 mm as measured toward the image side from the intersection between the 11th surface and the optical axis.

$f_n/f = -1.1228$ $f_p/f = 0.4928$ $\{|r| - \sqrt{r^2 - (\phi/2)^2}\}/f = 2.6468 \times 10^{-2}$  $TL/f = 1.1947$ (Effective diameter of the 12th surface: $\phi = 32.82$)

Embodiment 7
f = 85 mm F/1.4 2ω = 28.5°

$r_1 = 64.9570$
  $d_1 = 5.9986$  $n_1 = 1.61700$  $\nu_1 = 62.79$
$r_2 = 105.5869$
  $d_2 = 0.0011$
$r_3 = 49.2750$
  $d_3 = 8.5002$  $n_2 = 1.61700$  $\nu_2 = 62.79$
$r_4 = 196.1504$
  $d_4 = 0.0335$
$r_5 = 38.4360$
  $d_5 = 11.4284$  $n_3 = 1.75500$  $\nu_3 = 52.33$
$r_6 = 53.4111$
  $d_6 = 2.4009$
$r_7 = 95.4691$
  $d_7 = 4.1267$  $n_4 = 1.76182$  $\nu_4 = 26.52$
$r_8 = 22.2376$
  $d_8 = 7.1000$
$r_9 = \infty$ (stop)
  $d_9 = 9.1272$
$r_{10} = -34.1757$
  $d_{10} = 4.0025$  $n_5 =$ (GRIN lens)
$r_{11} = -206.4939$
  $d_{11} = 0.8481$
$r_{12} = 153.1848$
  $d_{12} = 7.1866$  $n_6 = 1.83481$  $\nu_5 = 42.72$
$r_{13} = -50.5720$
  $d_{13} = 0.0108$
$r_{14} = 4846.3611$
  $d_{14} = 5.1672$  $n_7 = 1.83481$  $\nu_6 = 42.72$
$r_{15} = -130.7253$ Formula of refractive index distribution:
$n(x) = n_0 + n_1 x$
d-line: $n_0 = 1.64769$  $n_1 = -0.15000 \times 10^{-1}$
g-line: $n_0 = 1.67252$  $n_1 = -0.15600 \times 10^{-1}$ Value of n is obtained at a point of 3 mm as measured toward the image side from the intersection between the 10th surface and the optical axis.

$f_n/f = -0.7019$ $f_p/f = 0.4258$ $\{|r| - \sqrt{r^2 - (\phi/2)^2}\}/f = 4.4090 \times 10^{-2}$  $TL/f = 1.2251$ (Effective diameter of the 10th surface: $\phi = 31.12$)

Embodiment 8
f = 85 mm  F/1.4  2ω = 28.5°

$r_1 = 59.0761$
  $d_1 = 7.5543$  $n_1 = 1.61700$  $\nu_1 = 62.79$
$r_2 = 221.0031$
  $d_2 = 0.0000$
$r_3 = 39.0398$
  $d_3 = 8.7563$  $n_2 = 1.49700$  $\nu_2 = 81.61$
$r_4 = 103.3482$
  $d_4 = 0.0000$
$r_5 = 33.7884$
  $d_5 = 9.7333$  $n_3 = 1.65160$  $\nu_3 = 58.52$
$r_6 = 40.5932$
  $d_6 = 2.7593$
$r_7 = 75.4263$
  $d_7 = 1.8002$  $n_4 = 1.75520$  $\nu_4 = 27.51$
$r_8 = 20.0081$
  $d_8 = 8.1000$
$r_9 = \infty$ (stop)
  $d_9 = D_1$
$r_{10} = -31.9959$
  $d_{10} = 3.6676$  $n_5 = 1.57501$  $\nu_5 = 41.49$
$r_{11} = -71.0636$
  $d_{11} = 4.4852$  $n_6 =$ (GRIN lens)
$r_{12} = -70.5894$
  $d_{12} = D_2$
$r_{13} = 115.6206$
  $d_{13} = 4.8380$  $n_7 = 1.75500$  $\nu_6 = 52.33$
$r_{14} = -52.3424$

| Object distance | | −850 mm |
|---|---|---|
| $D_1$ | 8.252 | 11.271 |
| $D_2$ | 0.000 | 1.304 |

Formula of refractive index distribution:
$n(x) = n_0 + n_1 x + n_2 x^2 + n_3 x^3 + n_4 x^4 + n_5 x^5$ d-line: $n_0 = 1.68893$  $n_1 = 0.14463 \times 10^{-1}$
$n_2 = -0.66868 \times 10^{-2}$
g-line: $n_0 = 1.71781$  $n_1 = 0.15116 \times 10^{-1}$
$n_2 = -0.69889 \times 10^{-2}$ d: $n_3 = -0.36256 \times 10^{-2}$  $n_4 = -0.53957 \times 10^{-3}$
$n_5 = -0.26014 \times 10^{-4}$
g: $n_3 = -0.37894 \times 10^{-2}$  $n_4 = -0.56395 \times 10^{-3}$
$n_5 = -0.27189 \times 10^{-4}$ Value of n is obtained at a point of 5 mm as measured toward the image side from the intersection between the 11th surface and the optical axis.

$f_n/f = -1.3863$ $f_p/f = 0.5685$ $\{|r| - \sqrt{r^2 - (\phi/2)^2}\}/f = 2.1478 \times 10^{-2}$  $TL/f = 1.1547$ (Effective diameter of the 12th surface: $\phi = 31.90$)

Embodiment 9
f = 85 mm  F/1.4  2ω = 28.5°

$r_1 = 56.4895$
  $d_1 = 8.1706$  $n_1 = 1.69680$  $\nu_1 = 56.49$
$r_2 = 168.0379$
  $d_2 = 0.1000$
$r_3 = 42.3007$
  $d_3 = 9.1854$  $n_2 = 1.49700$  $\nu_2 = 81.61$
$r_4 = 104.1944$
  $d_4 = 0.1000$
$r_5 = 34.3681$
  $d_5 = 9.3384$  $n_3 = 1.69680$  $\nu_3 = 56.49$
$r_6 = 39.7232$
  $d_6 = 3.1999$
$r_7 = 86.9960$
  $d_7 = 1.8002$  $n_4 = 1.78470$  $\nu_4 = 26.22$

-continued

Embodiment 9

$r_8 = 21.2188$  
$\quad d_8 = 8.0149$  
$r_9 = \infty$ (stop)  
$\quad d_9 = 6.9563$  
$r_{10} = -33.6607$  
$\quad d_{10} = 3.0561 \quad n_5 = 1.69895 \quad \nu_5 = 30.12$  
$r_{11} = 283.8177$  
$\quad d_{11} = D_1$  
$r_{12} = 134.8861$  
$\quad d_{12} = 4.5522 \quad n_6 = 1.79952 \quad \nu_6 = 42.24$  
$r_{13} = -48.6875$  
$\quad d_{13} = D_2$  
$r_{14} = 108.0869$  
$\quad d_{14} = 4.8194 \quad n_7 = $ (GRIN lens)  
$r_{15} = -95.8120$

| Object distance | $\infty$ | $-850$ mm |
|---|---|---|
| $D_1$ | 0.586 | 0.100 |
| $D_2$ | 0.100 | 3.089 |

Formula of refractive index distribution:  
$n(x) = n_0 + n_1 x + n_2 x^2 + n_3 x^3 + n_4 x^4 + n_5 x^5$

| d-line: | $n_0 = 1.68893$ | $n_1 = -0.14463 \times 10^{-1}$ |
|---|---|---|
| | $n_2 = -0.66868 \times 10^{-2}$ | |
| g-line: | $n_0 = 1.71781$ | $n_1 = -0.15116 \times 10^{-1}$ |
| | $n_2 = -0.69889 \times 10^{-2}$ | |
| d: | $n_3 = 0.36256 \times 10^{-2}$ | $n_4 = -0.53957 \times 10^{-3}$ |
| | $n_5 = 0.26014 \times 10^{-4}$ | |
| g: | $n_3 = 0.37894 \times 10^{-2}$ | $n_4 = -0.56395 \times 10^{-3}$ |
| | $n_5 = 0.27189 \times 10^{-4}$ | |

Value of n is obtained at a point of measured toward the image side from the intersection between the 14th surface and the optical axis.

$f_n/f = -0.5045$ $f_p/f = 0.3416$ $\{|r| - \sqrt{r^2 - (\phi/2)^2}\}/f = 1.5426 \times 10^{-2} \quad TL/f = 1.1563$ (Effective diameter of the 14th surface: $\phi = 33.57$)

Embodiment 10

$f = 85$ mm $\quad$ F/1.4 $\quad 2\omega = 28.5°$ $r_1 = 58.0406$  
$\quad d_1 = 7.5002 \quad n_1 = 1.69680 \quad \nu_1 = 56.49$  
$r_2 = 201.1615$  
$\quad d_2 = 0.0001$  
$r_3 = 40.3428$  
$\quad d_3 = 8.5484 \quad n_2 = 1.49700 \quad \nu_2 = 81.61$  
$r_4 = 99.2018$  
$\quad d_4 = 0.0013$  
$r_5 = 35.2327$  
$\quad d_5 = 9.4209 \quad n_3 = 1.69680 \quad \nu_3 = 56.49$  
$r_6 = 40.5456$  
$\quad d_6 = 2.9590$  
$r_7 = 80.5657$  
$\quad d_7 = 1.8002 \quad n_4 = 1.78470 \quad \nu_4 = 26.22$  
$r_8 = 21.1169$  
$\quad d_8 = 8.0101$  
$r_9 = \infty$ (stop)  
$\quad d_9 = D_1$  
$r_{10} = -34.5773$  
$\quad d_{10} = 3.3846 \quad n_5 = 1.69895 \quad \nu_5 = 30.12$  
$r_{11} = \infty$  
$\quad d_{11} = 4.7255 \quad n_6 = $ (GRIN lens)  
$r_{12} = -62.9669$  
$\quad d_{12} = D_2$  
$r_{13} = 116.1256$  
$\quad d_{13} = 4.4631 \quad n_7 = 1.79952 \quad \nu_6 = 42.24$  
$r_{14} = -58.3491$

-continued

Embodiment 10

| Object distance | $\infty$ | $-850$ mm |
|---|---|---|
| $D_1$ | 8.193 | 11.719 |
| $D_2$ | 0.377 | 1.490 |

Formula of refractive index distribution:  
$n(x) = n_0 + n_1 x + n_2 x^2 + n_3 x^3 + n_4 x^4 + n_5 x^5$

| d-line: | $n_0 = 1.68893$ | $n_1 = 0.14463 \times 10^{-2}$ |
|---|---|---|
| | $n_2 = -0.66868 \times 10^{-2}$ | |
| g-line: | $n_0 = 1.71781$ | $n_1 = 0.15116 \times 10^{-1}$ |
| | $n_2 = -0.69889 \times 10^{-2}$ | |
| d: | $n_3 = -0.36256 \times 10^{-2}$ | $n_4 = -0.53957 \times 10^{-3}$ |
| | $n_5 = -0.26014 \times 10^{-4}$ | |
| g: | $n_3 = -0.37894 \times 10^{-2}$ | $n_4 = -0.56395 \times 10^{-3}$ |
| | $n_5 = -0.27189 \times 10^{-4}$ | |

Value of n is obtained at a point of 5 mm as measured toward the image side from the intersection between the 11th surface and the optical axis.

$f_n/f = -1.4213$ $f_p/f = 0.5780$ $\{|r| - \sqrt{r^2 - (\phi/2)^2}\}/f = 2.4765 \times 10^{-2} \quad TL/f = 1.1504$ (Effective diameter of the 12th surface: $\phi = 32.29$)

Embodiment 11

$f = 85$ mm $\quad$ F/1.4 $\quad 2\omega = 28.5°$ $r_1 = 57.7990$  
$\quad d_1 = 7.9418 \quad n_1 = 1.69680 \quad \nu_1 = 56.49$  
$r_2 = 238.1222$  
$\quad d_2 = 0.1000$  
$r_3 = 39.4134$  
$\quad d_3 = 8.0486 \quad n_2 = 1.49700 \quad \nu_2 = 81.61$  
$r_4 = 84.0024$  
$\quad d_4 = 0.1000$  
$r_5 = 36.9777$  
$\quad d_5 = 9.3825 \quad n_3 = 1.69680 \quad \nu_3 = 56.49$  
$r_6 = 43.0550$  
$\quad d_6 = 2.9132$  
$r_7 = 86.3657$  
$\quad d_7 = 1.8002 \quad n_4 = 1.78470 \quad \nu_4 = 26.22$  
$r_8 = 21.6557$  
$\quad d_8 = 7.9399$  
$r_9 = \infty$ (stop)  
$\quad d_9 = 6.2670$  
$r_{10} = -37.6468$  
$\quad d_{10} = 2.8747 \quad n_5 = 1.69895 \quad \nu_5 = 30.12$  
$r_{11} = \infty$  
$\quad d_{11} = D_1$  
$r_{12} = \infty$  
$\quad d_{12} = 4.3668 \quad n_6 = $ (GRIN lens)  
$r_{13} = -67.9978$  
$\quad d_{13} = D_2$  
$r_{14} = 107.5675$  
$\quad d_{14} = 4.9843 \quad n_7 = 1.79952 \quad \nu_6 = 42.24$  
$r_{15} = -65.2434$

| Object distance | $\infty$ | $-850$ mm |
|---|---|---|
| $D_1$ | 1.433 | 0.200 |
| $D_2$ | 0.100 | 3.237 |

Formula of refractive index distribution:  
$n(x) = n_0 + n_1 x + n_2 x^2 + n_3 x^3 + n_4 x^4 + n_5 x^5$

| d-line: | $n_0 = 1.68893$ | $n_1 = 0.14463 \times 10^{-1}$ |
|---|---|---|
| | $n_2 = -0.66868 \times 10^{-2}$ | |
| g-line: | $n_0 = 1.71781$ | $n_1 = 0.15116 \times 10^{-1}$ |
| | $n_2 = -0.69889 \times 10^{-2}$ | |
| d: | $n_3 = -0.36256 \times 10^{-2}$ | $n_4 = -0.53957 \times 10^{-3}$ |
| | $n_5 = -0.26014 \times 10^{-4}$ | |

-continued

Embodiment 11 g: $n_3 = -0.37894 \times 10^{-2}$  $n_4 = -0.56395 \times 10^{-3}$
$n_5 = -0.27189 \times 10^{-4}$ Value of n is obtained at a point of 5 mm as measured toward the image side from the intersection between the 12th surface and the optical axis.

$f_n/f = -0.6337$ $f_p/f = 0.4050$ $\{|r| - \sqrt{r^2 - (\phi/2)^2}\}/f = 2.4160 \times 10^{-2}$  $TL/f = 1.1547$ (Effective diameter of the 13th surface: $\phi = 33.17$)

Embodiment 12 f = 85 mm    F/1.4    $2\omega = 28.5°$

| | | | |
|---|---|---|---|
| $r_1 = 78.2023$ | | | |
| | $d_1 = 6.0285$ | $n_1 = 1.72916$ | $\nu_1 = 54.68$ |
| $r_2 = 357.3543$ | | | |
| | $d_2 = 0.1000$ | | |
| $r_3 = 48.2307$ | | | |
| | $d_3 = 8.4574$ | $n_2 = 1.43425$ | $\nu_2 = 95.00$ |
| $r_4 = 95.0333$ | | | |
| | $d_4 = 0.1000$ | | |
| $r_5 = 35.7774$ | | | |
| | $d_5 = 10.4312$ | $n_3 = 1.69680$ | $\nu_3 = 56.49$ |
| $r_6 = 44.1317$ | | | |
| | $d_6 = 2.6495$ | | |
| $r_7 = 64.3460$ | | | |
| | $d_7 = 6.1577$ | $n_4 = 1.80518$ | $\nu_4 = 25.43$ |
| $r_8 = 21.6977$ | | | |
| | $d_8 = 7.0070$ | | |
| $r_9 = \infty$ (stop) | | | |
| | $d_9 = 6.6909$ | | |
| $r_{10} = -33.6823$ | | | |
| | $d_{10} = 2.4216$ | $n_5 = 1.61340$ | $\nu_5 = 43.84$ |
| $r_{11} = 35.9752$ | | | |
| | $d_{11} = 7.4944$ | $n_6 = 1.72916$ | $\nu_6 = 54.68$ |
| $r_{12} = -66.5591$ | | | |
| | $d_{12} = D_1$ | | |
| $r_{13} = 3040.2720$ | | | |
| | $d_{13} = 3.6000$ | $n_7 = 1.69680$ | $\nu_7 = 56.49$ |
| $r_{14} = -83.0358$ | | | |
| | $d_{14} = D_2$ | | |
| $r_{15} = 190.1413$ | | | |
| | $d_{15} = 3.6000$ | $n_8 = $ (GRIN lens) | |
| $r_{16} = -135.9356$ | | | |

| Object distance | $\infty$ | $-850$ mm |
|---|---|---|
| $D_1$ | 1.544 | 0.814 |
| $D_2$ | 0.180 | 4.494 |

Formula of refractive index distribution:
$n(x) = n_0 + n_1 x$

| | | |
|---|---|---|
| d-line: $n_0 = 1.64831$ | | $n_1 = 0.12441 \times 10^{-1}$ |
| g-line: $n_0 = 1.67315$ | | $n_1 = 0.13729 \times 10^{-1}$ |

Value of n is obtained at a point of 1 mm as measured toward the image side from the intersection between the 15th surface and the optical axis.

$f_n/f = -3.9970$ $f_p/f = 0.6978$ $\{|r| - \sqrt{r^2 - (\phi/2)^2}\}/f = 1.2020 \times 10^{-2}$ (Effective diameter of the 16th surface: $\phi = 16.64$)
$TL/f = 1.2366$

Embodiment 13 f = 85 mm    F/1.4    $2\omega = 28.5°$

| | | | |
|---|---|---|---|
| $r_1 = 76.0708$ | | | |
| | $d_1 = 6.0285$ | $n_1 = 1.72916$ | $\nu_1 = 54.68$ |
| $r_2 = 280.5699$ | | | |
| | $d_2 = 0.1000$ | | |
| $r_3 = 46.7567$ | | | |
| | $d_3 = 8.5598$ | $n_2 = 1.43425$ | $\nu_2 = 95.00$ |
| $r_4 = 117.6177$ | | | |
| | $d_4 = 0.1000$ | | |
| $r_5 = 36.1394$ | | | |
| | $d_5 = 10.4361$ | $n_3 = 1.69680$ | $\nu_3 = 56.49$ |
| $r_6 = 41.3274$ | | | |
| | $d_6 = 2.6527$ | | |
| $r_7 = 67.4527$ | | | |
| | $d_7 = 6.3464$ | $n_4 = 1.80518$ | $\nu_4 = 25.43$ |
| $r_8 = 21.8048$ | | | |
| | $d_8 = 7.1028$ | | |
| $r_9 = \infty$ (stop) | | | |
| | $d_9 = 7.3716$ | | |
| $r_{10} = -33.4468$ | | | |
| | $d_{10} = 2.5189$ | $n_5 = 1.61340$ | $\nu_5 = 43.84$ |
| $r_{11} = 36.8336$ | | | |
| | $d_{11} = 6.5000$ | $n_6 = 1.72916$ | $\nu_6 = 54.68$ |
| $r_{12} = -74.2477$ | | | |
| | $d_{12} = D_1$ | | |
| $r_{13} = -595.4942$ | | | |
| | $d_{13} = 3.6000$ | $n_7 = $ (GRIN lens) | |
| $r_{14} = -89.9105$ | | | |
| | $d_{14} = D_2$ | | |
| $r_{15} = 142.9520$ | | | |
| | $d_{15} = 3.6000$ | $n_8 = 1.72916$ | $\nu_7 = 54.68$ |
| $r_{16} = -98.7383$ | | | |

| Object distance | $\infty$ | $-850$ mm |
|---|---|---|
| $D_1$ | 1.613 | 0.771 |
| $D_2$ | 0.180 | 4.515 |

Formula of refractive index distribution:
$n(x) = n_0 + n_1 x$

| | | |
|---|---|---|
| d-line: $n_0 = 1.64831$ | | $n_1 = 0.12441 \times 10^{-1}$ |
| g-line: $n_0 = 1.67315$ | | $n_1 = 0.13729 \times 10^{-1}$ |

Value of n is obtained at a point of 1 mm as measured toward the image side from the intersection between the 13th surface and the optical axis.

$f_n/f = -2.6454$ $f_p/f = 0.6264$ $\{|r| - \sqrt{r^2 - (\phi/2)^2}\}/f = 1.8795 \times 10^{-2}$ (Effective diameter of the 14th surface: $\phi = 33.75$)
$TL/f = 1.2395$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

In each of the Embodiments described above, the front lens group consists of three positive meniscus lens components and a negative lens component, whereas the rear lens group consists of a negative lens component and a positive lens component.

Figure 2:
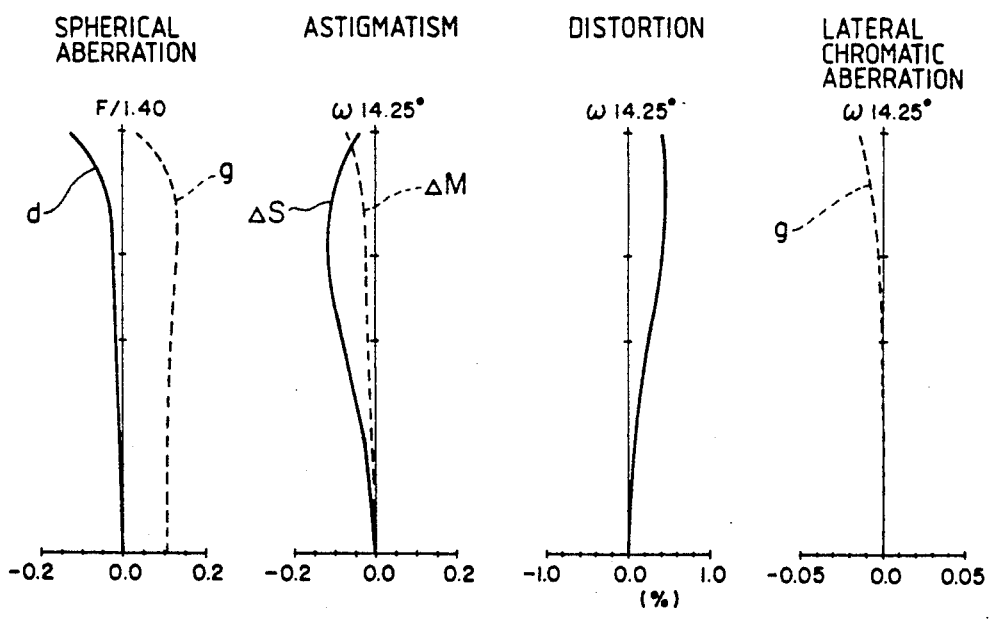
FIG. 2 shows curves illustrating aberration characteristics of the Embodiment 1 of the present invention.

The Embodiment 1 has the composition shown in FIG. 1 wherein the negative lens component and the positive lens component arranged in the rear lens group are designed as a negative meniscus lens component and a biconvex lens component respectively. Aberration characteristics of the Embodiment 1 are illustrated in FIG. 2.

Figure 3:
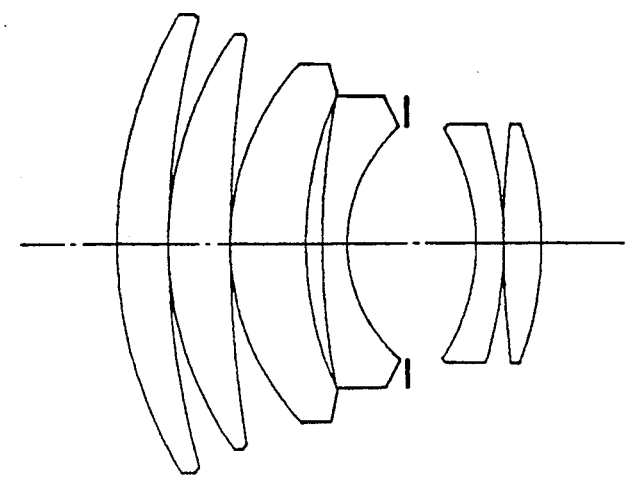
FIG. 3 shows a sectional view illustrating Embodiment 2 of the present invention.
Figure 4:
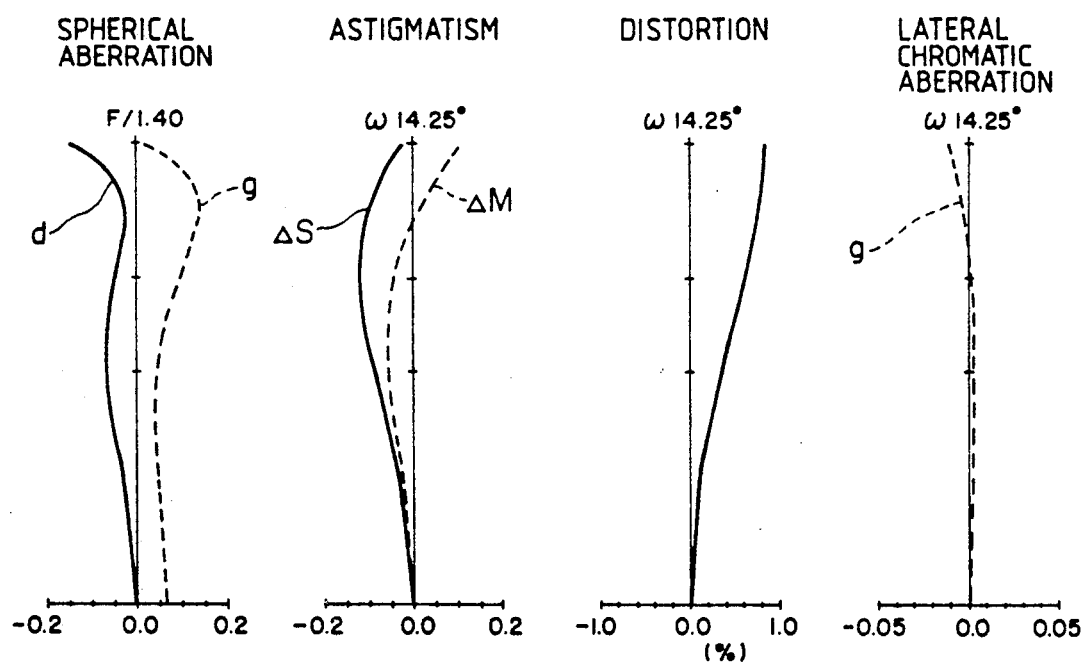
FIG. 4 shows curves illustrating aberration characteristics of the Embodiment 2 of the present invention.

The Embodiment 2 has the composition shown in FIG. 3 which is the same as that of the Embodiment 1. Aberration characteristics of the Embodiment 1 are illustrated in FIG. 2.

Figure 5:
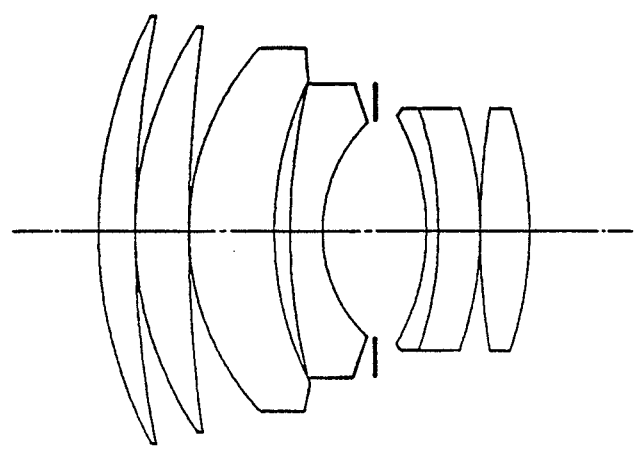
FIG. 5 shows a sectional view illustrating Embodiment 3 of the present invention.
Figure 6:
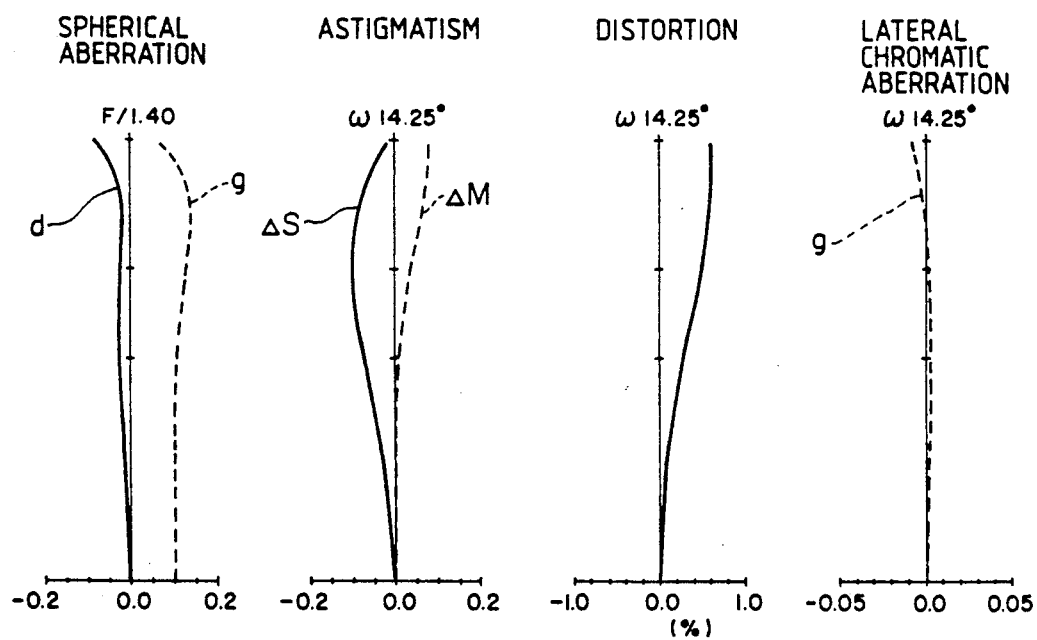
FIG. 6 shows graphs illustrating aberration characteristics of the Embodiment 3 of the present invention.

The Embodiment 3 has the composition shown in FIG. 5 wherein the negative lens component and the positive lens component arranged in the rear lens group are designed as a cemented doublet and a biconvex lens component respectively. Aberration characteristics of the Embodiment 3 are illustrated in FIG. 6.

Figure 7:
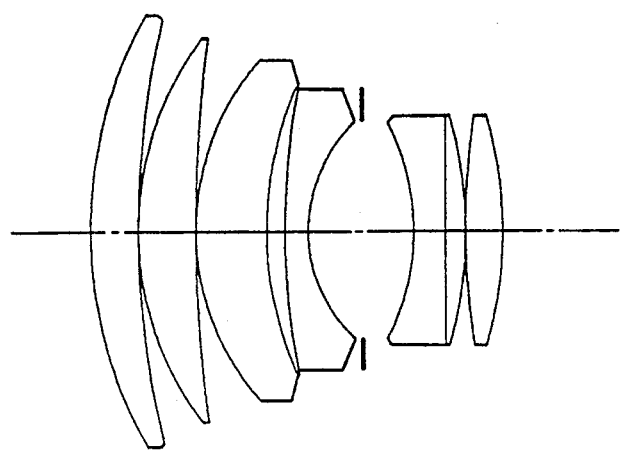
FIG. 7 shows a sectional view illustrating Embodiment 4 of the present invention.
Figure 8:
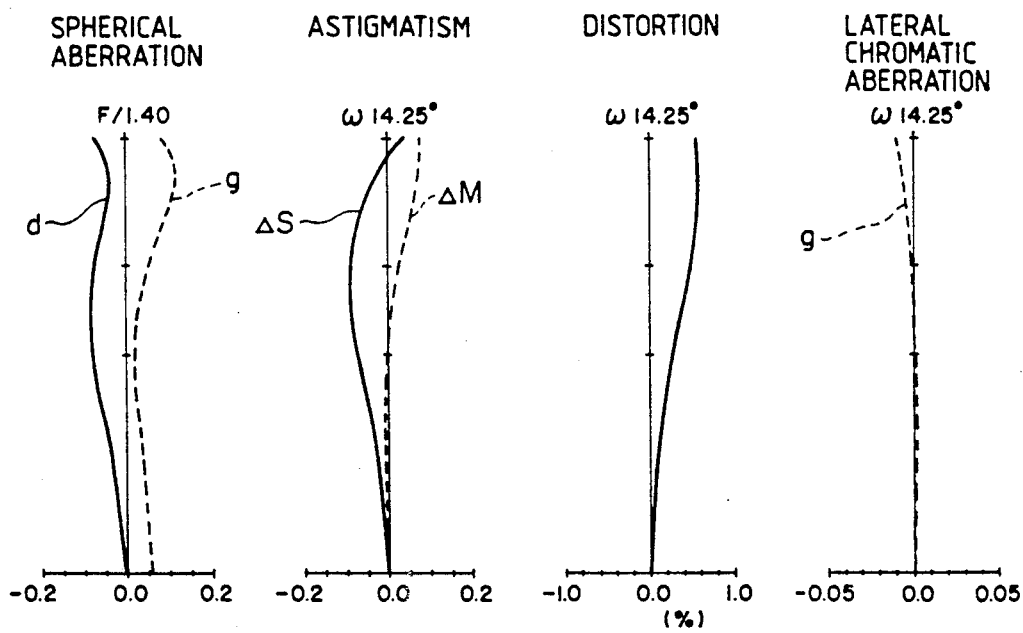
FIG. 8 and FIG. 9 show graphs illustrating aberration characteristics of the Embodiment 4 of the present invention.
Figure 9:
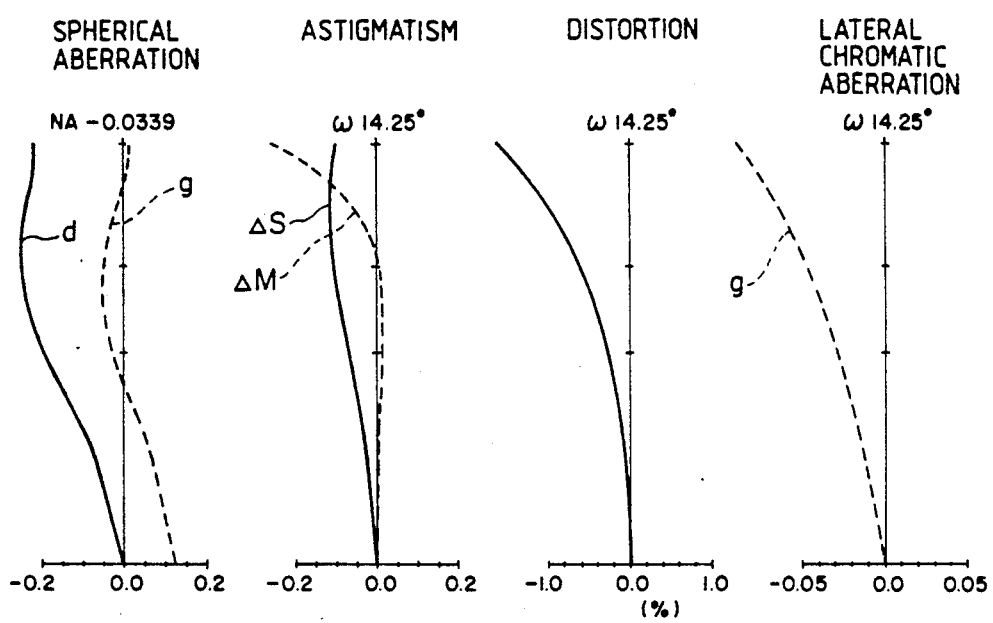

The Embodiment 4 has the composition shown in FIG. 7 wherein the negative lens component and the positive lens component arranged in the rear lens group are designed as a cemented doublet and a biconvex lens component respectively. Aberration characteristics of the Embodiment 4 are illustrated in FIG. 8. This Embodiment is so adapted as to perform focusing by varying the airspaces $d_9$ and $d_{12}$, and has the aberration characteristics illustrated in FIG. 9 at a magnification level of $-0.1\times$.

Figure 10:
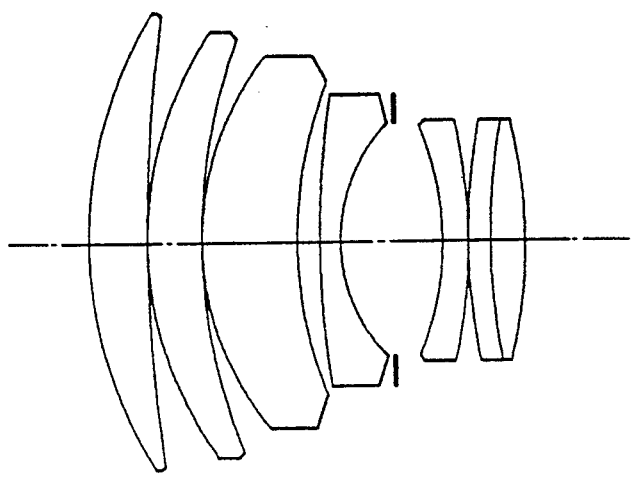
FIG. 10 shows a sectional view illustrating Embodiment 5 of the present invention.
Figure 11:
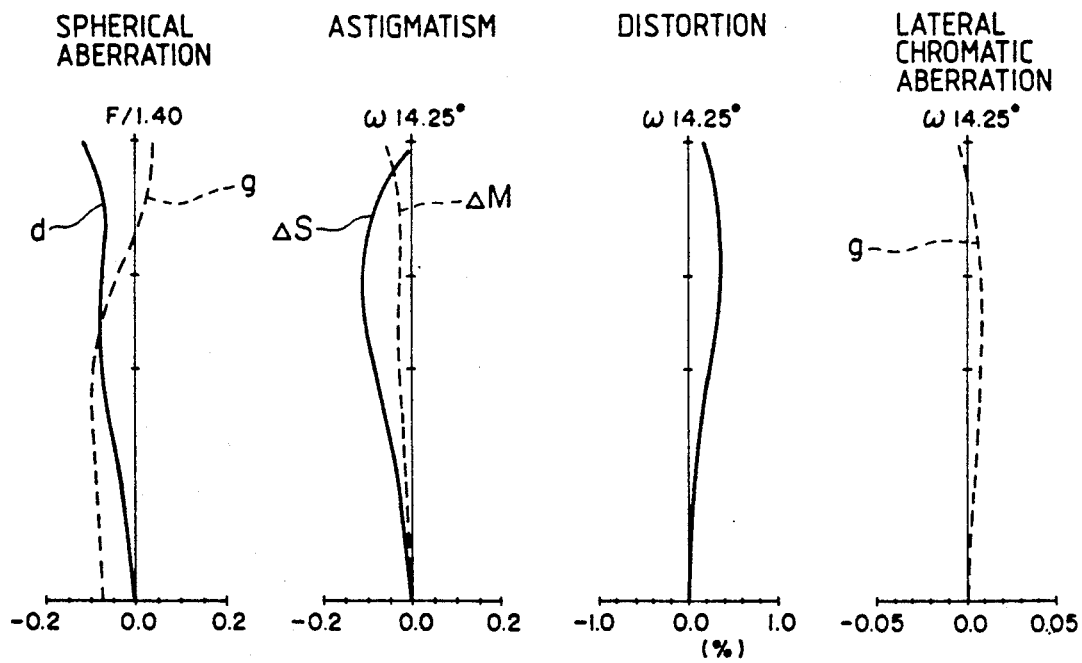
FIG. 11 shows curves illustrating aberration characteristics of the Embodiment 5 of the present invention.

The Embodiment 5 has the composition shown in FIG. 10 wherein the negative lens component and the positive lens component arranged in the rear lens group are designed as a negative meniscus lens component and a positive cemented doublet respectively. Aberration characteristics of the Embodiment 5 are illustrated in FIG. 11.

Figure 12:
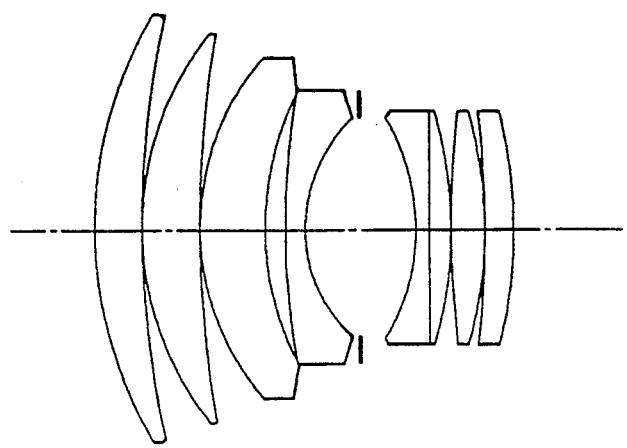
FIG. 12 shows a sectional view illustrating Embodiment 6 of the present invention.
Figure 13:
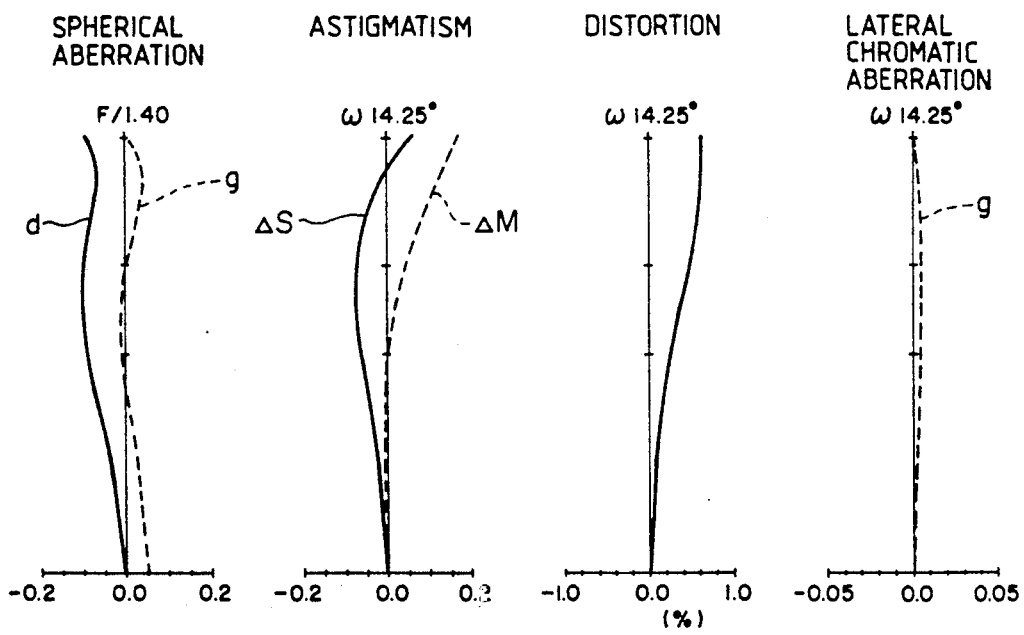
FIG. 13 shows curves illustrating aberration characteristics of the Embodiment 6 of the present invention.

The Embodiment 6 has the composition shown in FIG. 12 wherein the rear lens group consists of a negative lens component designed as a cemented doublet and a positive lens component consisting of two positive lens elements. Aberration characteristics of the Embodiment 6 are illustrated in FIG. 13.

Figure 14:
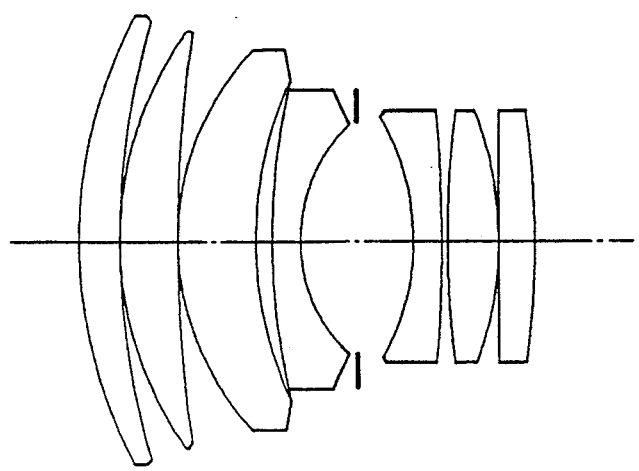
FIG. 14 shows a sectional view illustrating Embodiment 7 of the present invention.
Figure 15:
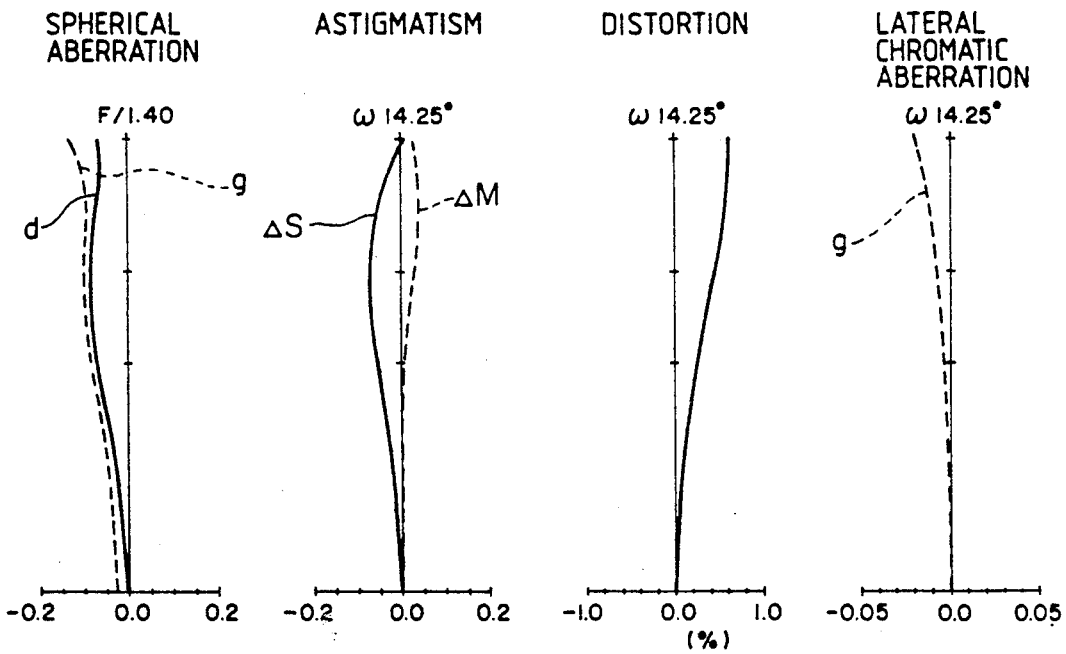
FIG. 15 shows curves illustrating aberration characteristics of the Embodiment 7 of the present invention.

The Embodiment 7 has the composition shown in FIG. 14 wherein the rear lens group consists of a negative lens component designed as a negative meniscus lens component and a positive lens component consisting of two positive lens elements. Aberration characteristics of the Embodiment 7 are visualized in FIG. 15.

Figure 16:
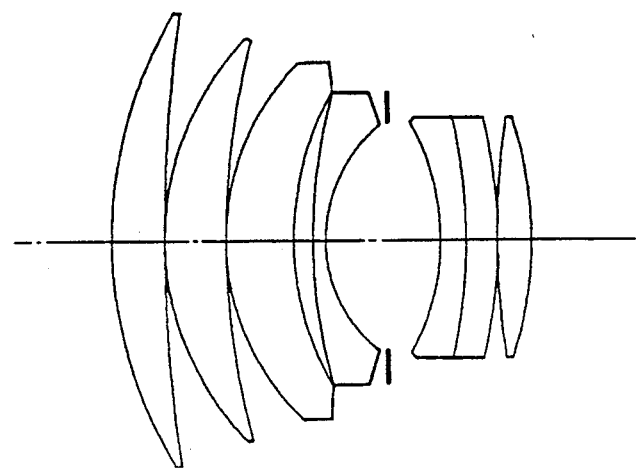
FIG. 16 shows a sectional view illustrating Embodiment 8 of the present invention.
Figure 17:
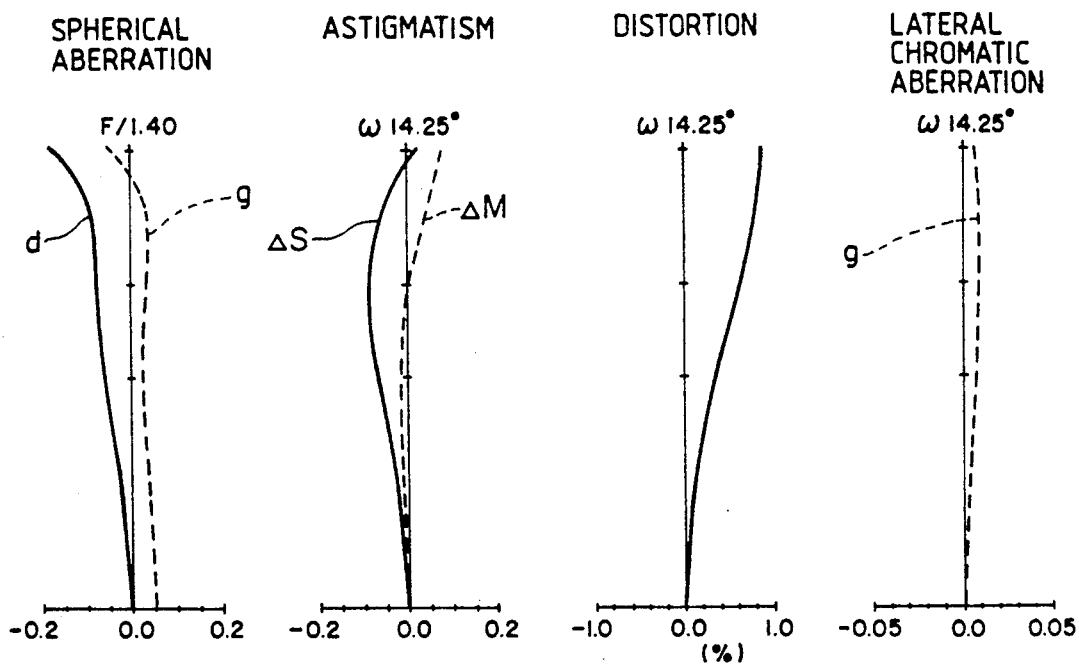
FIG. 17 and FIG. 18 show graphs illustrating aberration characteristics of the Embodiment 8 of the present invention.
Figure 18:
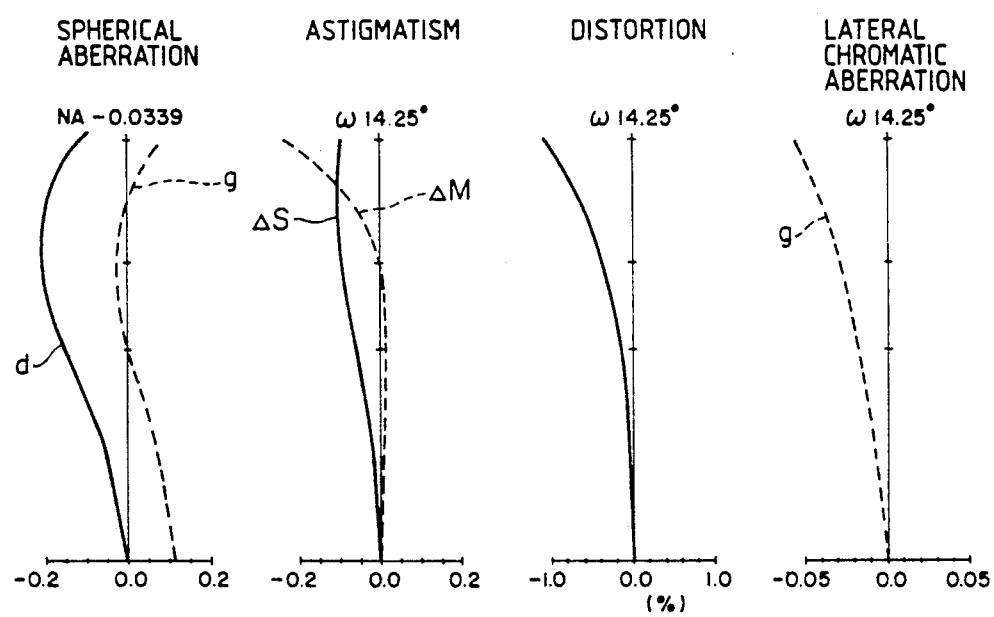

The Embodiment 8 has the composition shown in FIG. 16 wherein the negative lens component and the positive lens component arranged in the rear lens group are designed as a cemented doublet and a biconvex lens component respectively. The Embodiment 8 has the aberration characteristics illustrated in FIG. 17 when the lens system is focused on an object located at infinite distance, and exhibits the aberration characteristics visualized in FIG. 18 when it is set at a magnification level of $-0.1\times$ by varying the airspaces $d_9$ and $d_{12}$.

Figure 19:
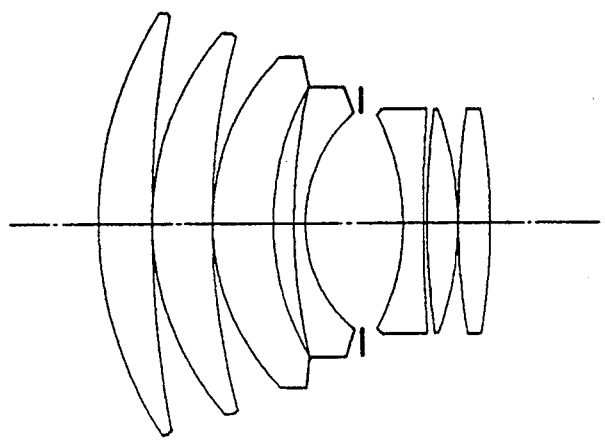
FIG. 19 shows a sectional view illustrating Embodiment 9 of the present invention.
Figure 20:
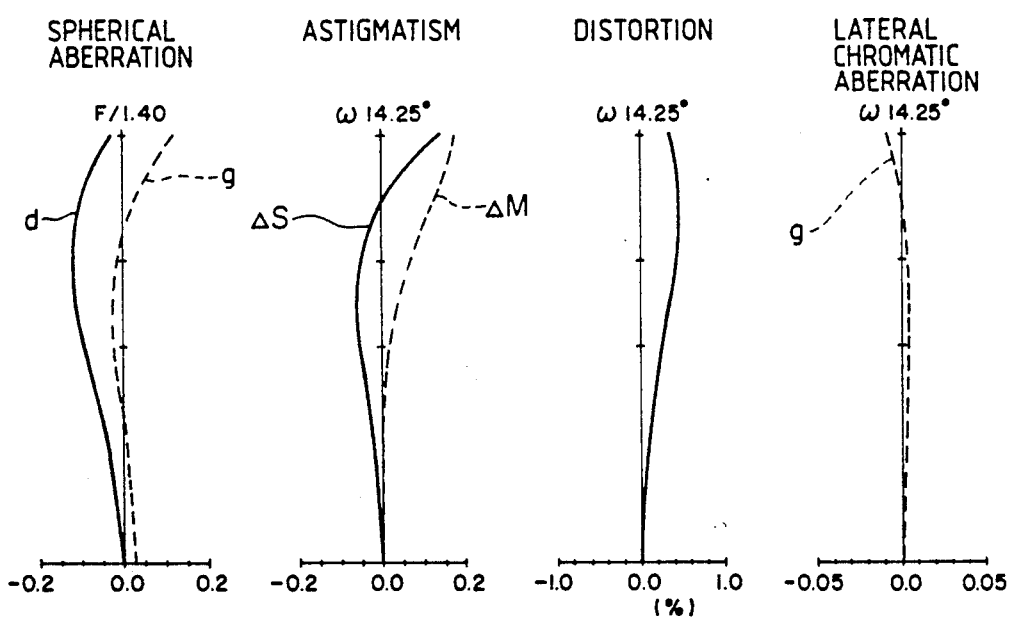
FIG. 20 and FIG. 21 show graphs illustrating aberration characteristics of the Embodiment 9 of the present invention.
Figure 21:
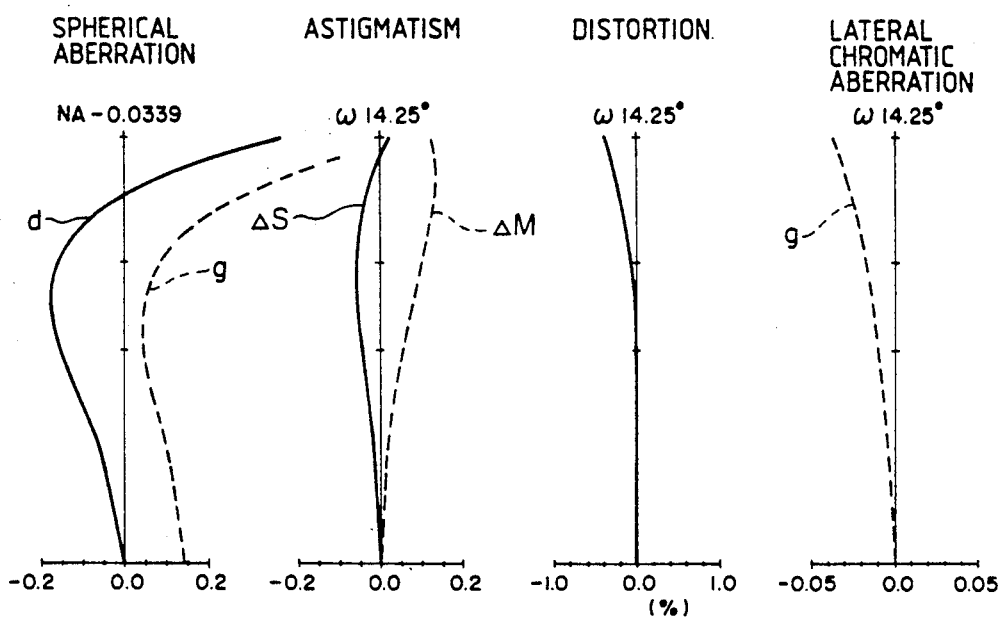

The Embodiment 9 has the composition shown in FIG. 19 wherein the rear lens group consists of a negative lens component designed as a negative meniscus lens component and a positive lens component consisting of two positive lens elements. The Embodiment 9 has the aberration characteristics illustrated in FIG. 20 when the lens system is focused on an object located at infinite distance, and the aberration characteristic visualized in FIG. 21 when it is set at a magnification level of $-0.1\times$ by varying the airspaces $d_{11}$ and $d_{13}$.

Figure 22:
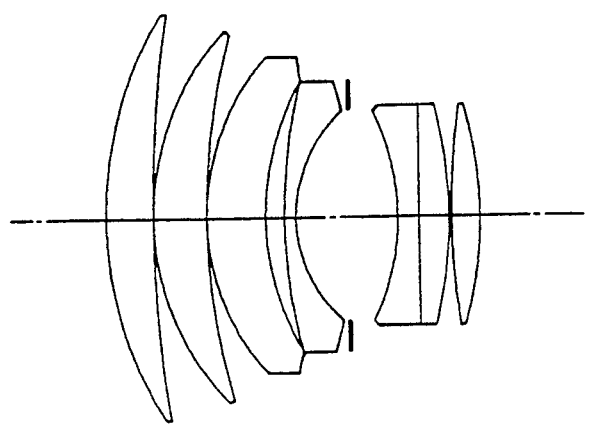
FIG. 22 shows a sectional view illustrating Embodiment 10 of the present invention.
Figure 23:
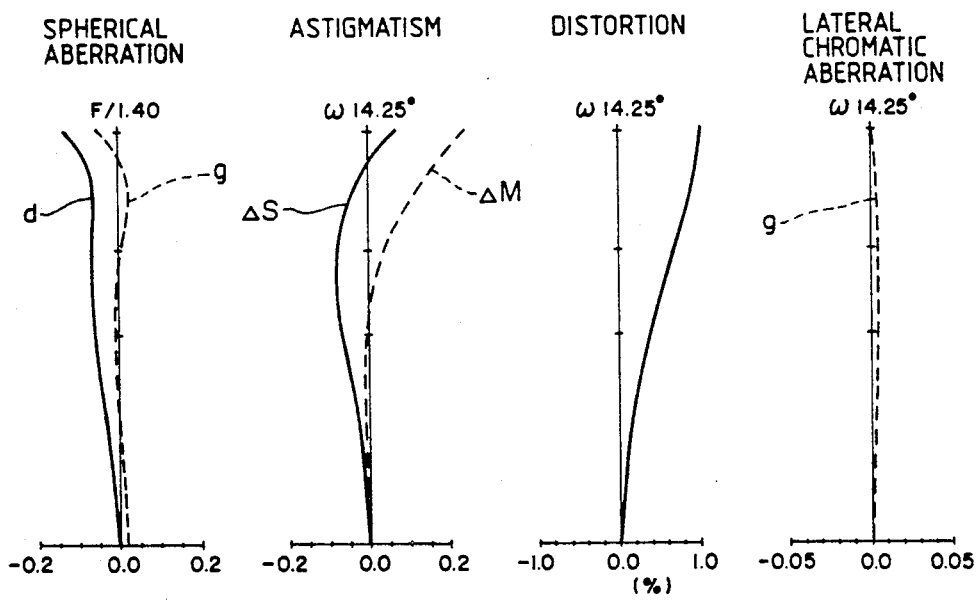
FIG. 23 and FIG. 24 show curves illustrating aberration characteristics of the Embodiment 10 of the present invention.
Figure 24:
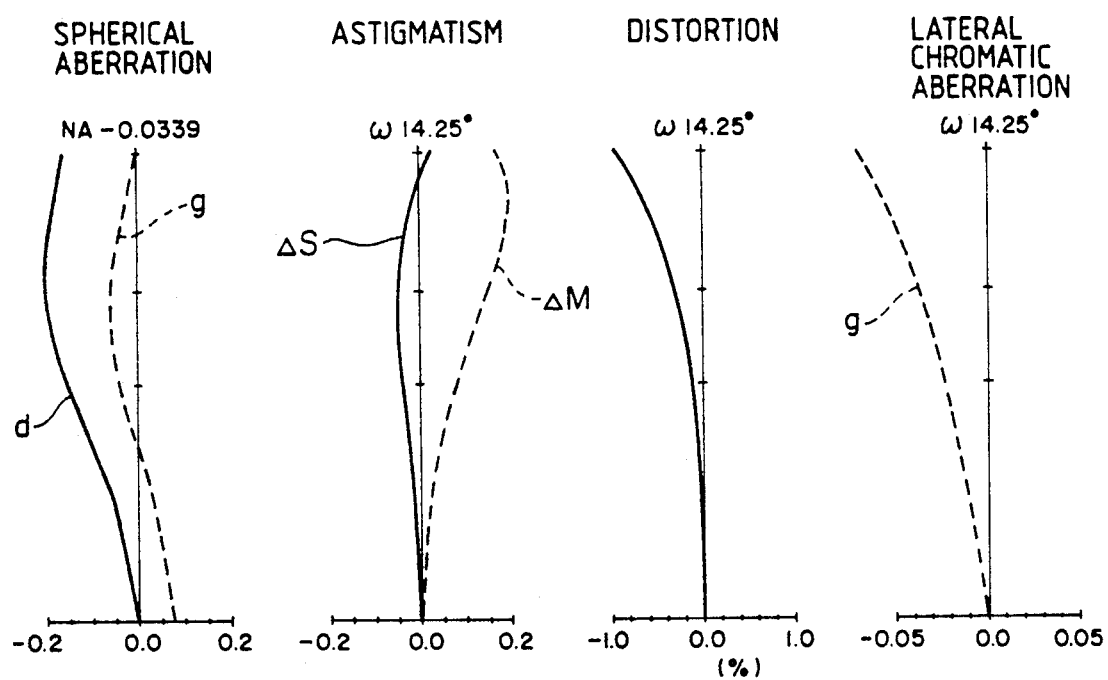

The Embodiment 10 has the composition shown in FIG. 22 wherein the negative lens component and the positive lens component arranged in the rear lens group are designed as a cemented doublet and a biconvex lens component respectively. The Embodiment 10 has the aberration characteristics illustrated in FIG. 23 when the lens system is focused on an object located at infinite distance, and the aberration characteristics visualized in FIG. 24 when it is set at a magnification level of $-0.1\times$ varying the airspaces $d_9$ and $d_{12}$.

Figure 25:
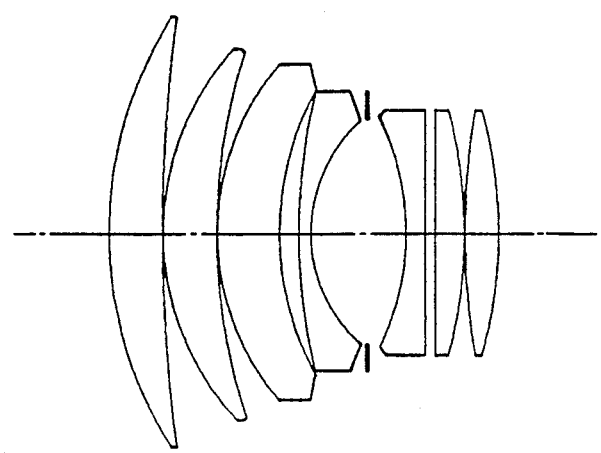
FIG. 25 shows a sectional view illustrating Embodiment 11 of the present invention.
Figure 26:
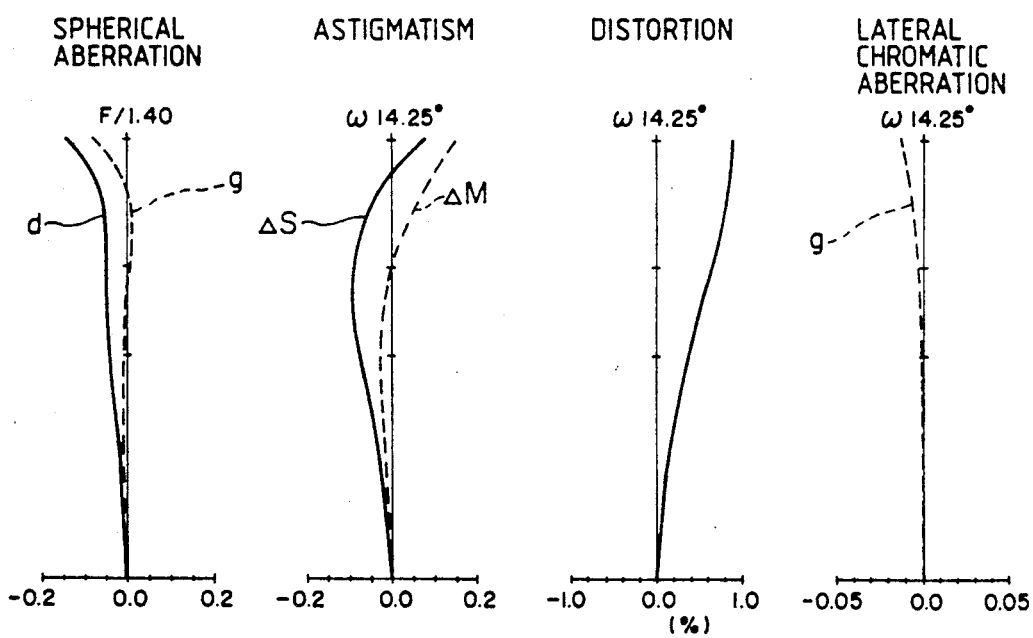
FIG. 26 and FIG. 27 show curves illustrating aberration characteristics of the Embodiment 11 of the present invention.
Figure 27:
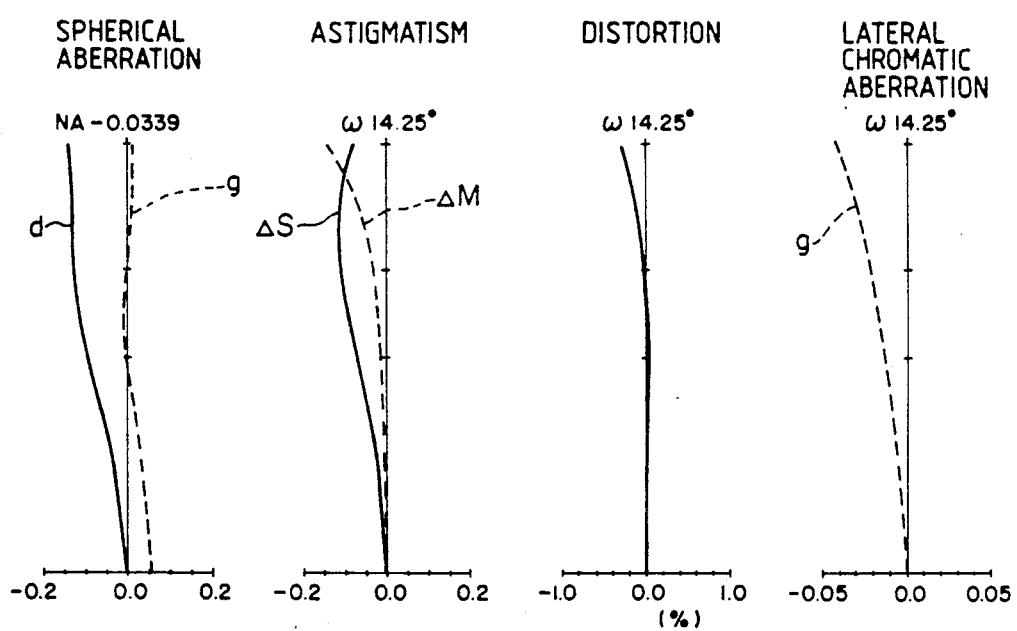

The Embodiment 11 has the composition shown in FIG. 25 wherein the rear lens group consists of a negative lens component designed as a concavo-plane lens component and a positive lens component consisting of two positive lens elements. The Embodiment 11 has the aberration characteristics illustrated in FIG. 26 when the lens system is focused on an object located at infinite distance, and the aberration characteristics visualized in FIG. 27 when it is set at a magnification level of $-0.1$ by varying the airspaces $d_{11}$ and $d_{13}$.

Figure 28:
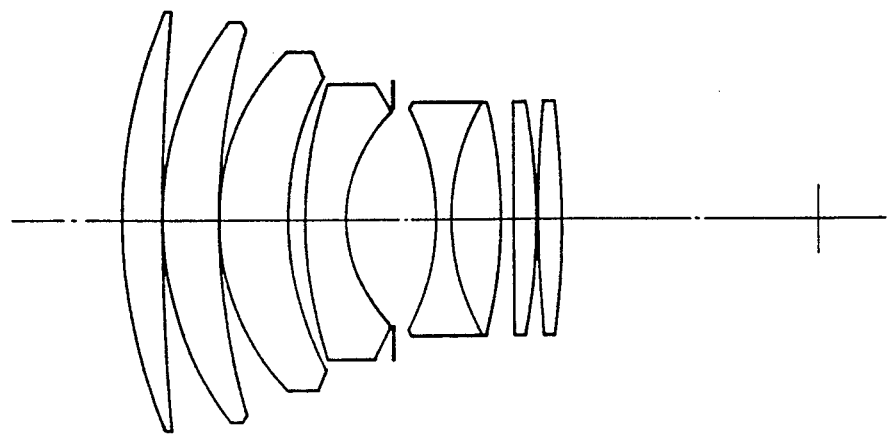
FIG. 28 shows a sectional view illustrating Embodiment 12 of the present invention.
Figure 31:
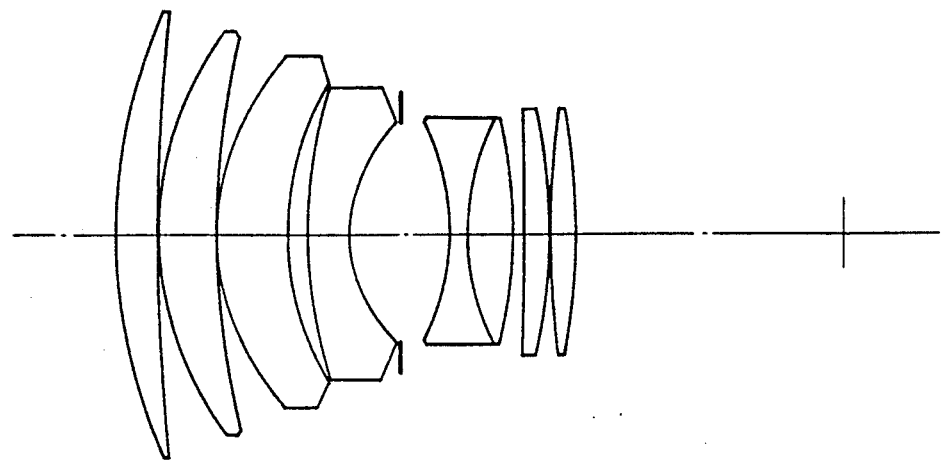
FIG. 31 shows a sectional view illustrating Embodiment 13 of the present invention.

The Embodiments 12 and 13 have the compositions shown in FIG. 28 and FIG. 31 respectively which are similar to that of the Embodiment 6 illustrated in FIG. 12.

Each of the Embodiments 12 and 13 is so adapted as to perform focusing by varying the airspaces $d_{12}$ and $d_{14}$.

Figure 29:
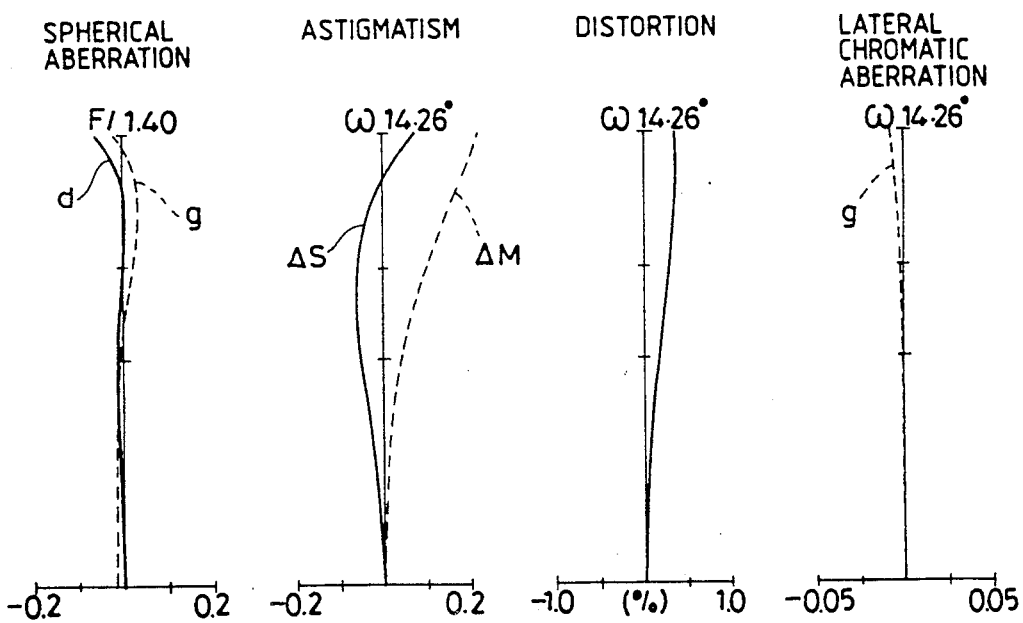
FIG. 29 and FIG. 30 show curves illustrating aberration characteristics of the Embodiment 12 of the present invention.
Figure 30:
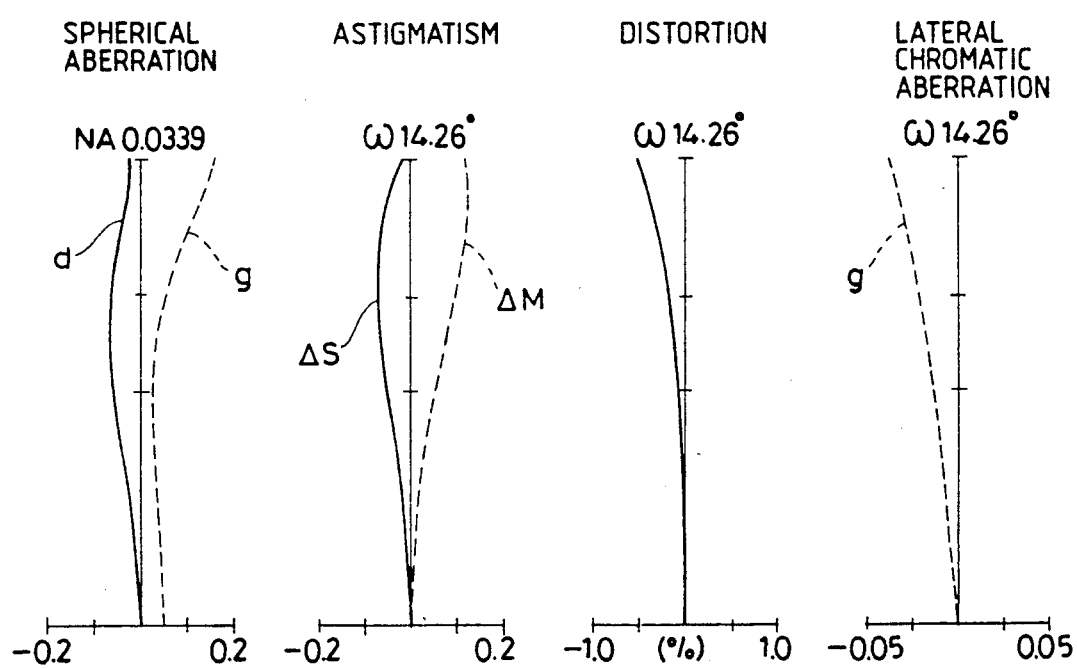

The Embodiment 12 has the aberration characteristics illustrated in FIG. 29 when the lens system is focused on an object located at infinite distance and the aberration characteristics visualized in FIG. 30 when it is focused on an object located at a distance of $-850$ mm.

Figure 32:
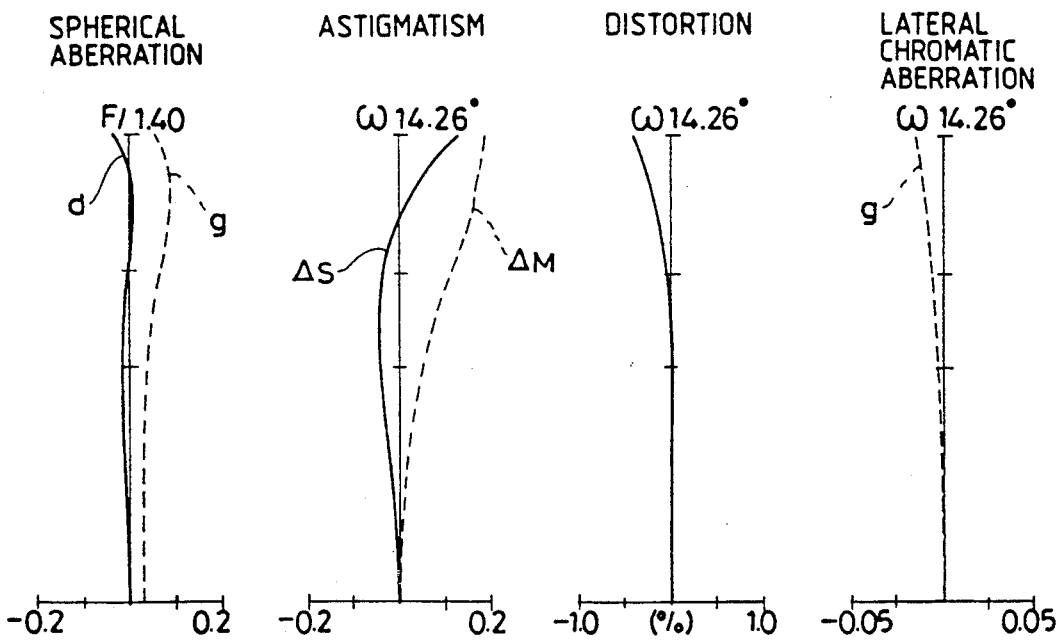
FIG. 32 and FIG. 33 show graphs illustrating aberration characteristics of the Embodiment 13 of the present invention.
Figure 33:
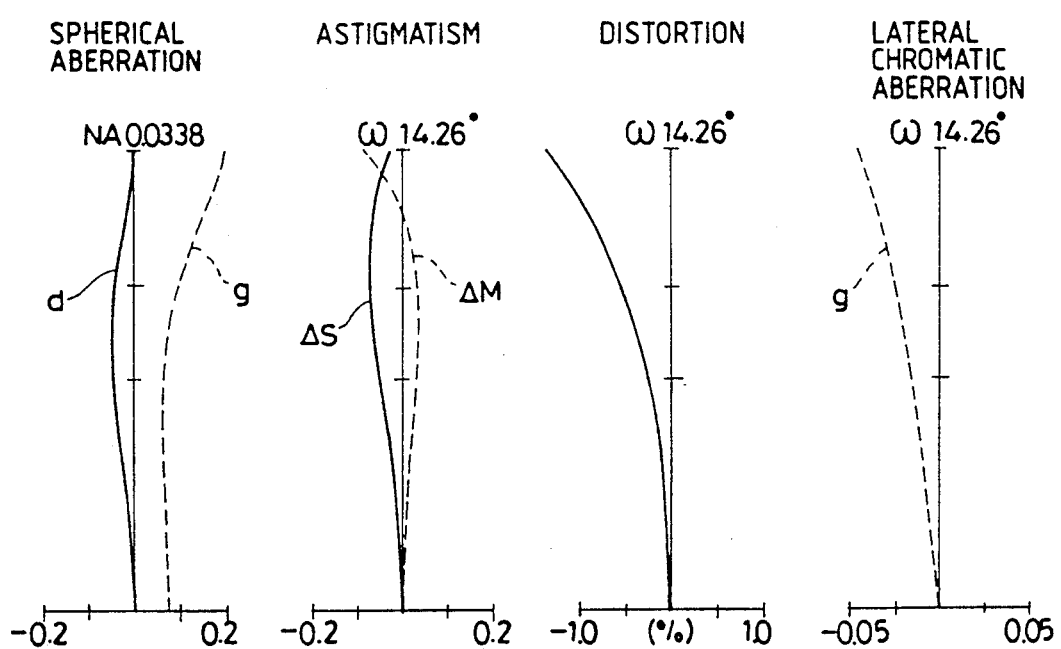

The Embodiment 13 has the aberration characteristics illustrated in FIG. 32 when the lens system is focused on an object located at infinite distance and the aberration characteristics visualized in FIG. 33 when it is focused on an object located at a distance of $-850$ mm. As is understood from the foregoing description, the quasi-telephoto lens system according to the present invention has a large aperture and provides images of high quality owing to the fact that the lens system comprises, at an adequate location, a GRIN lens element having refractive index gradients different at the individual wavelengths.

I claim:

1. A large-aperture quasi-telephoto lens system comprising: a front lens group and a rear lens group arranged in order from an object side, and a stop arranged between said front lens group and said rear lens group, said rear lens group having a negative lens component and a positive lens component arranged in the order from the object side, and comprising at lest one graded refractive index lens element, and satisfying the following conditions (1), (2) and (3):

$$-6.0 < f_n/f < 0 \qquad (1)$$

$$0.10 < f_p/f < 0.8 \qquad (2)$$

$$5.0 \times 10^{-3} < \{|r| - \sqrt{r^2 - (\phi/2)^2}\}/f < 9.5 \times 10^{-2} \qquad (3)$$

wherein the reference symbol f represents focal length of the lens system as a whole, the reference symbol $f_n$ designates focal length of said negative lens component, the reference symbol $f_p$ denotes focal length of said positive lens component, the reference symbol r represents radius of curvature on the surface having the higher refractive index on the optical axis of the graded refractive index lens element and the reference symbol $\phi$ designates effective diameter of said surface.

2. A large-aperture quasi-telephoto lens system according to claim 1, wherein said surface having the higher refractive index on the optical axis of the graded refractive index lens element has a concave shape and satisfies the following condition (3'):

$$(3') \quad 1.0 \times 10^{-2} < \{|r| - \sqrt{r^2 - (\phi/2)^2}\}/f < 9.5 \times 10^{-2}$$

3. A large-aperture quasi-telephoto lens system according to claim 1 satisfying the following condition (4):

$$TL/f < 1.6 \quad (4)$$

wherein the reference symbol TL represents distance as measured from the first surface to the image plane in the condition where said lens system is focused on an object located at infinite distance.

4. A large-aperture quasi-telephoto lens system according to claim 1 wherein said negative lens component is designed as a negative meniscus lens component, said positive lens component is designed as a biconvex lens component and said negative meniscus lens component is designed as a graded refractive index lens component.

5. A large-aperture quasi-telephoto lens system according to claim 1 wherein said negative lens component is designed as a cemented doublet consisting of a negative meniscus lens element and a positive meniscus lens element, said positive lens component is designed as a biconvex lens component, and said negative meniscus lens element is designed as a graded refractive index lens element.

6. A large-aperture quasi-telephoto lens system according to claim 1 wherein said negative lens component is designed as a cemented doublet consisting of a negative lens element and a positive lens element, said positive lens component is designed as a biconvex lens component, and said positive lens element is designed as a graded refractive index lens element.

7. A large-aperture quasi-telephoto lens system according to claim 1 wherein said negative lens component is designed as a negative meniscus lens component, said positive lens component is designed as a cemented doublet consisting of a negative lens element and a positive lens element, and said negative meniscus lens component is designed as a graded refractive index lens component.

8. A large-aperture quasi-telephoto lens system according to claim 1 wherein said negative lens component is designed as a cemented doublet consisting of a negative lens element and a positive lens element, said positive lens component consists of two positive lens elements, and the positive lens element of said negative lens component is designed as a graded refractive index lens element.

9. A large-aperture quasi-telephoto lens system according to claim 1 wherein said negative lens component is designed as a negative meniscus lens component, said positive lens component consists of two positive lens elements, and said negative lens component is designed as a graded refractive index lens component.

10. A large-aperture quasi-telephoto lens system according to claim 1 wherein said negative lens component is designed as a negative meniscus lens component, said positive lens component consists of two positive lens elements, and the positive lens element arranged on the image side is designed as a graded refractive index lens element.

11. A large-aperture quasi-telephoto lens system according to claim 1 wherein said negative lens component is designed as a negative meniscus lens component, said positive lens component consists of two positive lens elements, and the positive lens element arranged on the object side is designed as a graded refractive index lens element.

12. A large aperture quasi-telephoto lens system comprising:
in the recited order from the object side, a front lens group and a rear lens group,
a stop disposed between said front lens group and said rear lens group,
said rear lens group comprising a single negative lens component in a foremost position of said rear lens group and a positive lens component disposed after said negative lens component,
at least one lens element disposed in said rear lens group being a graded refractive lens element,
the at least one lens element and lenses comprising the lens groups being kept fixed on an optical axis in relation to one another so long as the lens system is to be focused.

13. A large-aperture quasi-telephoto lens system according to claim 12 so adapted as to perform focusing by varying the airspace reserved between said stop and said rear lens group, and the airspace reserved between said negative lens component and said positive lens component.

14. A large-aperture quasi-telephoto lens system according to claim 12 wherein said positive lens component consists of two positive lens elements, and said lens system is so adapted as to perform focusing by varying the airspace reserved between said negative lens component and said positive lens component and the airspace reserved between said positive lens elements.

15. A large-aperture quasi-telephoto lens system according to claim 12 wherein said negative lens component is designed as a negative meniscus lens component, said positive lens component is designed as a biconvex lens component and said negative meniscus lens component is designed as a graded refractive index lens component.

16. A large-aperture quasi-telephoto lens system according to claim 12 wherein said negative lens component is designed as a cemented doublet consisting of a negative meniscus lens element and a positive meniscus lens element, said positive lens component is designed as a biconvex lens component, and said negative meniscus lens element is designed as a graded refractive index lens element.

17. A large-aperture quasi-telephoto lens system according to claim 12 wherein said negative lens component is designed as a cemented doublet consisting of a negative lens element and a positive lens element, said positive lens component is designed as a biconvex lens component, and said positive lens element is designed as a graded refractive index lens element.

18. A large-aperture quasi-telephoto lens system according to claim 12 wherein said negative lens component is designed as a negative meniscus lens component, said positive lens component is designed as a cemented doublet consisting of a negative lens element and a positive lens element, and said negative meniscus lens component is designed as a graded refractive index lens component.

19. A large-aperture quasi-telephoto lens system according to claim 12 wherein said negative lens component is designed as a cemented doublet consisting of a negative lens element and a positive lens element, said positive lens component consists of two positive lens elements, and the positive lens element of said negative lens component is designed as a graded refractive index lens element.

20. A large-aperture quasi-telephoto lens system according to claim 1 wherein said negative lens component is designed as a negative meniscus lens component, said positive lens component consists of two positive lens elements, and the positive lens element arranged on the object side is designed as a graded refractive index lens element.

21. A large-aperture quasi-telephoto lens system according to claim 12 wherein said negative lens component is designed as a negative meniscus lens component, said positive lens component consists of two positive lens elements, and the positive lens element arranged on the image side is designed as a graded refractive index lens element.

22. A large-aperture quasi-telephoto lens system according to claim 12 wherein said negative lens component is designed as a negative meniscus lens component, said positive lens component consists of two positive lens elements, and the positive lens element arranged on the object side is designed as a graded refractive index lens element.

23. A large aperture quasi-telephoto lens system comprising: a front lens group and a rear lens group arranged in order from an object side, and a stop arranged between said front lens group and said rear lens group, said rear lens group comprising a cemented doublet and a positive lens component arranged on an image side of said cemented doublet, and said rear lens group including at least one graded refractive index lens component.

24. A large aperture quasi-telephoto lens system according to claim 23, wherein said cemented doublet is disposed at the foremost location in said rear lens group.

* * * * *